(12) United States Patent
Liu et al.

(10) Patent No.: US 8,329,308 B2
(45) Date of Patent: Dec. 11, 2012

(54) CEMENTITIOUS ARTICLE AND METHOD FOR PREPARING THE SAME

(75) Inventors: Qingxia Liu, Vernon Hills, IL (US); Michael P. Shake, Johnsburg, IL (US); Qiang Yu, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 740 days.

(21) Appl. No.: 12/415,931

(22) Filed: Mar. 31, 2009

(65) Prior Publication Data

US 2010/0247937 A1 Sep. 30, 2010

(51) Int. Cl.
*B32B 9/04* (2006.01)
*B32B 27/00* (2006.01)
*B05D 3/02* (2006.01)

(52) U.S. Cl. .................. 428/500; 428/411.1; 427/372.2

(58) Field of Classification Search .................. None
See application file for complete search history.

(56) References Cited

U.S. PATENT DOCUMENTS

| | | |
|---|---|---|
| 1,870,439 A | 8/1932 | Birdsey |
| 2,127,952 A | 8/1938 | Choate |
| 2,198,766 A | 4/1940 | Gallagher |
| 2,198,776 A | 4/1940 | King et al. |
| 2,216,207 A | 10/1940 | Menaul |
| 2,413,458 A | 12/1946 | Light |
| 2,425,883 A | 8/1947 | Jackson |
| 2,560,521 A | 7/1951 | Camp |
| 2,681,863 A | 6/1954 | Croce et al. |
| 2,803,575 A | 8/1957 | Riddell et al. |
| 2,806,811 A | 9/1957 | Hazmburg |
| 2,907,667 A | 10/1959 | Johnson |
| 2,970,127 A | 1/1961 | Slayter et al. |
| 3,086,953 A | 4/1963 | Nitzsche et al. |
| 3,155,567 A | 11/1964 | Harr |
| 3,259,536 A | 7/1966 | Gaeth et al. |
| 3,297,601 A | 1/1967 | Maynard et al. |
| 3,298,973 A | 1/1967 | Quarles et al. |
| 3,359,146 A | 12/1967 | Lane et al. |
| 3,382,083 A | 5/1968 | Marsden et al. |
| 3,389,042 A | 6/1968 | Bieri et al. |
| 3,455,710 A | 7/1969 | Nitzsche et al. |
| 3,459,571 A | 8/1969 | Shannon |
| 3,462,341 A | 8/1969 | Littin |
| 3,490,065 A | 1/1970 | Shannon et al. |
| 3,503,841 A | 3/1970 | Sterrett |
| 3,516,882 A | 6/1970 | Cummisford |
| 3,615,189 A | 10/1971 | Hayakawa et al. |
| 3,616,173 A | 10/1971 | Green et al. |
| 3,623,895 A | 11/1971 | Nitzsche et al. |
| 3,645,707 A | 2/1972 | Phillips |
| 3,650,785 A | 3/1972 | Ball et al. |
| 3,660,068 A | 5/1972 | Wilson |
| 3,663,168 A | 5/1972 | Rubin et al. |
| 3,663,355 A | 5/1972 | Shimizu et al. |
| 3,676,094 A | 7/1972 | Russell |
| 3,699,212 A | 10/1972 | Palm |
| 3,770,468 A | 11/1973 | Knauf et al. |
| 3,781,396 A | 12/1973 | Okuda et al. |
| 3,788,020 A | 1/1974 | Gregori |
| 3,839,059 A | 10/1974 | Rothfelder et al. |
| 3,839,239 A | 10/1974 | Godfried |
| 3,839,836 A | 10/1974 | Payne |
| 3,841,886 A | 10/1974 | Burr |
| 3,847,633 A | 11/1974 | Race |
| 3,847,766 A | 11/1974 | Klaus |
| 3,857,934 A | 12/1974 | Bernstein et al. |
| 3,874,980 A | 4/1975 | Richards et al. |
| 3,903,879 A | 9/1975 | Riley et al. |
| 3,908,062 A | 9/1975 | Roberts |
| 3,915,919 A | 10/1975 | Nishioka et al. |
| 3,922,413 A | 11/1975 | Reineman |
| 3,922,459 A | 11/1975 | Franz et al. |
| 3,934,066 A | 1/1976 | Murch |
| 3,935,021 A | 1/1976 | Greve et al. |
| 3,935,343 A | 1/1976 | Nuttall |
| 3,936,414 A | 2/1976 | Wright et al. |
| 3,944,698 A | 3/1976 | Dierks et al. |
| 3,949,144 A | 4/1976 | Duff |

(Continued)

FOREIGN PATENT DOCUMENTS

| | | |
|---|---|---|
| AU | 69055-74 | 11/1975 |
| CA | 993779 | 7/1976 |
| CA | 2116443 A1 | 3/1993 |
| DE | 78 06 114 U1 | 3/1978 |
| DE | 28 08 723 A1 | 1/1980 |
| DE | 3135865 A1 | 3/1983 |
| DE | 35 08 933 A1 | 10/1986 |
| DE | 198 53 450 A1 | 5/2000 |
| EP | 0154094 A2 | 9/1985 |
| EP | 0 681 998 A1 | 11/1995 |

(Continued)

OTHER PUBLICATIONS

U.S. Appl. No. 61/109,886, filed Oct. 30, 2008, Shake et al.
U.S. Appl. No. 12/176,200, filed Jul. 18, 2008, Shake et al.
Van Wazer, *Phosphorus and Its Compounds*, vol. 1, Interscience Publishers, Inc., New York (1958), pp. 419-427 and pp. 6799-695.

(Continued)

*Primary Examiner* — Sheeba Ahmed
(74) *Attorney, Agent, or Firm* — Leydig Voit & Mayer, Ltd.; Philip T. Petti; David F. Janci

(57) ABSTRACT

A cementitious article and a method of making a cementitious article are disclosed. The cementitious article comprises a cementitious component that comprises a polyvinyl acetate type polymer, a monobasic phosphate, and optionally boric acid. Cementitious articles, such as board, are prepared such that the polyvinyl acetate type polymer, the monobasic phosphate, and optionally boric acid can be present in the cementitious core, and/or in dense layers if present. The concentration of the polyvinyl acetate type polymer, monobasic phosphate, and optionally boric acid in the cementitious article can increase from a central region A to peripheral regions B and C, respectively. In some embodiments, the polyvinyl acetate type polymer is a polyvinyl alcohol and the monobasic phosphate is monoammonium phosphate.

8 Claims, 4 Drawing Sheets

U.S. PATENT DOCUMENTS

| | | |
|---|---|---|
| 3,951,675 A | 4/1976 | Krempff |
| 3,951,735 A | 4/1976 | Kondo et al. |
| 3,955,031 A | 5/1976 | Jones et al. |
| 3,957,501 A | 5/1976 | Matsuda et al. |
| 3,964,256 A | 6/1976 | Plantif et al. |
| 3,967,016 A | 6/1976 | Schneller et al. |
| 3,977,888 A | 8/1976 | Sano et al. |
| 3,980,487 A | 9/1976 | Akabayashi et al. |
| 3,987,600 A | 10/1976 | Baehr |
| 3,993,822 A | 11/1976 | Knauf et al. |
| 3,994,110 A | 11/1976 | Ropella |
| 3,998,023 A | 12/1976 | Anderson |
| 4,005,959 A | 2/1977 | Kautz |
| 4,009,062 A | 2/1977 | Long |
| 4,010,134 A | 3/1977 | Braunisch et al. |
| 4,015,386 A | 4/1977 | Cook |
| 4,027,043 A | 5/1977 | Schroeder et al. |
| 4,028,125 A | 6/1977 | Martin |
| 4,028,158 A | 6/1977 | Hipchen et al. |
| 4,036,658 A | 7/1977 | Pühringer et al. |
| 4,036,659 A | 7/1977 | Stude |
| 4,040,950 A | 8/1977 | Zipperian et al. |
| 4,042,536 A | 8/1977 | Dieterich et al. |
| 4,043,862 A | 8/1977 | Roberts |
| 4,043,950 A | 8/1977 | Wilmsen et al. |
| 4,044,520 A | 8/1977 | Barrows |
| 4,049,778 A | 9/1977 | Hodgson |
| 4,054,461 A | 10/1977 | Martin |
| 4,054,462 A | 10/1977 | Stude |
| 4,063,976 A | 12/1977 | Wain et al. |
| 4,065,413 A | 12/1977 | MacInnis et al. |
| 4,065,597 A | 12/1977 | Gillespie |
| 4,070,311 A | 1/1978 | Cominassi et al. |
| 4,075,804 A | 2/1978 | Zimmerman |
| 4,076,580 A | 2/1978 | Panusch et al. |
| 4,081,598 A | 3/1978 | Morgan et al. |
| 4,088,738 A | 5/1978 | Hauge |
| 4,094,694 A | 6/1978 | Long |
| 4,097,423 A | 6/1978 | Dieterich |
| 4,101,335 A | 7/1978 | Barrable |
| 4,101,475 A | 7/1978 | Stalego |
| 4,102,697 A | 7/1978 | Fukuba et al. |
| 4,107,376 A | 8/1978 | Ishikawa |
| 4,112,174 A | 9/1978 | Hannes et al. |
| 4,113,913 A | 9/1978 | Smiley |
| 4,125,498 A | 11/1978 | Blount |
| 4,136,215 A | 1/1979 | den Otter et al. |
| 4,148,781 A | 4/1979 | Narukawa et al. |
| 4,154,593 A | 5/1979 | Brown et al. |
| 4,165,413 A | 8/1979 | Sefton et al. |
| 4,169,907 A | 10/1979 | Barker et al. |
| 4,174,230 A | 11/1979 | Hashimoto et al. |
| 4,183,908 A | 1/1980 | Rolfe |
| 4,184,022 A | 1/1980 | Lawyer |
| 4,186,236 A | 1/1980 | Heitmann |
| 4,187,130 A | 2/1980 | Kautz |
| 4,195,110 A | 3/1980 | Dierks et al. |
| 4,197,225 A | 4/1980 | Emmons et al. |
| 4,203,788 A | 5/1980 | Clear |
| 4,204,030 A | 5/1980 | Takamizawa et al. |
| 4,205,136 A | 5/1980 | Ohashi et al. |
| 4,210,725 A | 7/1980 | Redfarn |
| 4,214,027 A | 7/1980 | Knauf et al. |
| 4,217,333 A | 8/1980 | Löblich |
| 4,221,697 A | 9/1980 | Osborn et al. |
| 4,229,329 A | 10/1980 | Bennett |
| 4,230,616 A | 10/1980 | Godfried |
| 4,233,343 A | 11/1980 | Barker et al. |
| 4,233,368 A | 11/1980 | Baehr et al. |
| 4,236,911 A | 12/1980 | McCullough et al. |
| 4,242,406 A | 12/1980 | El Bouhnini et al. |
| 4,242,407 A | 12/1980 | Bijen |
| 4,245,029 A | 1/1981 | Crivello |
| 4,255,483 A | 3/1981 | Byrd et al. |
| 4,256,799 A | 3/1981 | Ohashi et al. |
| 4,258,102 A | 3/1981 | Traver et al. |
| 4,265,964 A | 5/1981 | Burkhart |
| 4,265,979 A | 5/1981 | Baehr et al. |
| 4,292,353 A | 9/1981 | Ohashi et al. |
| 4,292,364 A | 9/1981 | Wesch et al. |
| 4,296,015 A | 10/1981 | Aotani et al. |
| 4,296,169 A | 10/1981 | Shannon |
| 4,297,311 A | 10/1981 | Sherman et al. |
| 4,303,722 A | 12/1981 | Pilgrim |
| 4,304,877 A | 12/1981 | Blount |
| 4,306,395 A | 12/1981 | Carpenter |
| 4,311,767 A | 1/1982 | Kennedy |
| 4,315,967 A | 2/1982 | Prior et al. |
| 4,322,301 A | 3/1982 | Blackmore |
| 4,324,775 A | 4/1982 | Tung |
| 4,327,143 A | 4/1982 | Alvino et al. |
| 4,327,146 A | 4/1982 | White |
| 4,341,560 A | 7/1982 | Salto et al. |
| 4,343,127 A | 8/1982 | Greve et al. |
| 4,344,804 A | 8/1982 | Bijen et al. |
| 4,350,533 A | 9/1982 | Galer et al. |
| 4,360,386 A | 11/1982 | Bounini |
| 4,361,616 A | 11/1982 | Bömers |
| 4,361,995 A | 12/1982 | Buck et al. |
| 4,364,991 A | 12/1982 | Byrd et al. |
| 4,372,814 A | 2/1983 | Johnstone et al. |
| 4,372,997 A | 2/1983 | Fritze et al. |
| 4,376,674 A | 3/1983 | Ali |
| 4,378,405 A | 3/1983 | Pilgrim |
| 4,380,592 A | 4/1983 | Blount |
| 4,381,716 A | 5/1983 | Hastings et al. |
| 4,388,366 A | 6/1983 | Rosato et al. |
| 4,392,896 A | 7/1983 | Sakakibara |
| 4,393,015 A | 7/1983 | Kaneda et al. |
| 4,394,411 A | 7/1983 | Krüll et al. |
| 4,399,046 A | 8/1983 | Okamura et al. |
| 4,399,110 A | 8/1983 | Kurandt |
| 4,403,006 A | 9/1983 | Bruce et al. |
| 4,406,738 A | 9/1983 | Fink et al. |
| 4,407,884 A | 10/1983 | Witt |
| 4,411,701 A | 10/1983 | Saito et al. |
| 4,411,702 A | 10/1983 | Makino et al. |
| 4,421,704 A | 12/1983 | Reily |
| 4,433,020 A | 2/1984 | Narukawa et al. |
| 4,433,069 A | 2/1984 | Harper |
| 4,436,645 A | 3/1984 | Ceaser |
| 4,441,944 A | 4/1984 | Massey |
| 4,447,254 A | 5/1984 | Hughes et al. |
| 4,447,498 A | 5/1984 | Fink et al. |
| 4,450,022 A | 5/1984 | Galer |
| 4,462,831 A | 7/1984 | Raevsky et al. |
| 4,463,043 A | 7/1984 | Reeves et al. |
| 4,477,300 A | 10/1984 | Pilgrim |
| 4,477,533 A | 10/1984 | Phillips |
| 4,486,476 A | 12/1984 | Fritsch et al. |
| 4,489,176 A | 12/1984 | Kluth et al. |
| 4,501,787 A | 2/1985 | Marchetti et al. |
| 4,502,901 A | 3/1985 | Burkard |
| 4,504,533 A | 3/1985 | Altenhöfer et al. |
| 4,508,774 A | 4/1985 | Grabhoefer et al. |
| 4,517,095 A | 5/1985 | Ceaser |
| 4,518,508 A | 5/1985 | Conner |
| 4,518,652 A | 5/1985 | Willoughby |
| 4,528,238 A | 7/1985 | Alford |
| 4,529,705 A | 7/1985 | Larsen |
| 4,543,281 A | 9/1985 | Pedersen et al. |
| 4,544,424 A | 10/1985 | Take et al. |
| 4,557,961 A | 12/1985 | Gorges |
| 4,557,973 A | 12/1985 | Ali |
| 4,563,285 A | 1/1986 | Nair et al. |
| 4,564,544 A | 1/1986 | Burkard et al. |
| 4,572,861 A | 2/1986 | Barretto Garcia et al. |
| 4,572,865 A | 2/1986 | Gluck et al. |
| 4,578,301 A | 3/1986 | Currie et al. |
| 4,613,627 A | 9/1986 | Sherman et al. |
| 4,618,642 A | 10/1986 | Schoenherr |
| 4,619,655 A | 10/1986 | Hanker et al. |
| 4,619,701 A | 10/1986 | Angrick et al. |
| 4,636,538 A | 1/1987 | Malcolm-Brown |
| 4,637,951 A | 1/1987 | Gill et al. |
| 4,643,771 A | 2/1987 | Steinbach et al. |
| 4,645,548 A | 2/1987 | Take et al. |

| Patent | Kind | Date | Inventor |
|---|---|---|---|
| 4,646,494 | A | 3/1987 | Saarinen et al. |
| 4,647,496 | A | 3/1987 | Lehnert et al. |
| 4,664,707 | A | 5/1987 | Wilson et al. |
| 4,681,798 | A | 7/1987 | Gill et al. |
| 4,684,567 | A | 8/1987 | Okamoto et al. |
| 4,704,263 | A | 11/1987 | Berry et al. |
| 4,721,659 | A * | 1/1988 | Tieckelmann et al. ........ 428/701 |
| 4,729,853 | A | 3/1988 | von Bonin |
| 4,745,032 | A | 5/1988 | Morrison |
| 4,746,365 | A | 5/1988 | Babcock et al. |
| 4,748,051 | A | 5/1988 | Songer et al. |
| 4,748,771 | A | 6/1988 | Lehnert et al. |
| 4,759,964 | A | 7/1988 | Fischer et al. |
| 4,767,656 | A | 8/1988 | Chee et al. |
| 4,772,326 | A | 9/1988 | Heinen et al. |
| 4,784,897 | A | 11/1988 | Brands et al. |
| 4,810,552 | A | 3/1989 | Meyer |
| 4,810,569 | A | 3/1989 | Lehnert et al. |
| 4,849,018 | A | 7/1989 | Babcock et al. |
| 4,857,211 | A | 8/1989 | Nineuil et al. |
| 4,861,397 | A | 8/1989 | Hillstrom |
| 4,879,173 | A | 11/1989 | Randall |
| 4,904,694 | A | 2/1990 | Matsuoka et al. |
| 4,916,004 | A | 4/1990 | Ensminger et al. |
| 4,927,463 | A | 5/1990 | Kloetzer et al. |
| 4,948,647 | A | 8/1990 | Burkard |
| 4,975,122 | A | 12/1990 | Parkinson et al. |
| 4,992,481 | A | 2/1991 | von Bonin et al. |
| 4,999,066 | A | 3/1991 | Sherif |
| 5,062,235 | A | 11/1991 | Cook, Jr. et al. |
| 5,068,103 | A | 11/1991 | Kawazi et al. |
| 5,073,198 | A | 12/1991 | Kurz |
| 5,079,078 | A | 1/1992 | Jutte, Jr. et al. |
| 5,082,501 | A | 1/1992 | Kurz |
| 5,091,441 | A | 2/1992 | Omura |
| 5,100,948 | A | 3/1992 | Aydin et al. |
| 5,102,728 | A | 4/1992 | Gay et al. |
| 5,112,678 | A | 5/1992 | Gay et al. |
| 5,118,336 | A | 6/1992 | Biez |
| 5,120,355 | A | 6/1992 | Imai |
| 5,135,805 | A | 8/1992 | Sellers et al. |
| 5,141,561 | A | 8/1992 | Ledard et al. |
| 5,148,645 | A | 9/1992 | Lehnert et al. |
| 5,149,368 | A | 9/1992 | Liu et al. |
| 5,155,959 | A | 10/1992 | Richards et al. |
| 5,160,639 | A | 11/1992 | McCollum |
| 5,171,366 | A | 12/1992 | Richards et al. |
| 5,198,052 | A | 3/1993 | Ali |
| 5,220,762 | A | 6/1993 | Lehnert et al. |
| 5,258,069 | A | 11/1993 | Knechtel et al. |
| 5,281,265 | A | 1/1994 | Liu |
| 5,284,700 | A | 2/1994 | Strauss et al. |
| 5,292,781 | A | 3/1994 | Floyd |
| 5,296,026 | A | 3/1994 | Monroe et al. |
| 5,304,239 | A | 4/1994 | Schwabe et al. |
| 5,308,692 | A | 5/1994 | Kennedy et al. |
| 5,319,900 | A | 6/1994 | Lehnert et al. |
| 5,320,677 | A | 6/1994 | Baig |
| 5,336,316 | A | 8/1994 | Dawson et al. |
| 5,340,392 | A | 8/1994 | Westbrook et al. |
| 5,342,680 | A | 8/1994 | Randall |
| 5,366,507 | A | 11/1994 | Sottosanti |
| 5,366,810 | A | 11/1994 | Merrifield et al. |
| 5,371,989 | A | 12/1994 | Lehnert et al. |
| 5,389,716 | A | 2/1995 | Graves |
| 5,395,685 | A | 3/1995 | Seth et al. |
| 5,397,631 | A | 3/1995 | Green et al. |
| 5,401,310 | A | 3/1995 | Ture |
| 5,401,588 | A | 3/1995 | Garvey et al. |
| 5,411,941 | A | 5/1995 | Grinna et al. |
| 5,437,722 | A | 8/1995 | Borenstein |
| 5,458,973 | A | 10/1995 | Jeffs |
| 5,462,722 | A | 10/1995 | Liu et al. |
| 5,466,273 | A | 11/1995 | Connell |
| 5,468,282 | A | 11/1995 | Yugami et al. |
| 5,484,653 | A | 1/1996 | Kennedy et al. |
| 5,496,914 | A | 3/1996 | Wood et al. |
| 5,500,668 | A | 3/1996 | Malhotra et al. |
| 5,508,263 | A | 4/1996 | Grinna et al. |
| 5,520,926 | A | 5/1996 | Ferguson |
| 5,527,982 | A | 6/1996 | Pal et al. |
| 5,545,297 | A | 8/1996 | Andersen et al. |
| 5,549,859 | A | 8/1996 | Andersen et al. |
| 5,552,187 | A | 9/1996 | Green et al. |
| 5,614,307 | A | 3/1997 | Andersen et al. |
| 5,618,627 | A | 4/1997 | Merrifield et al. |
| 5,624,481 | A | 4/1997 | Gerhardinger et al. |
| 5,626,668 | A | 5/1997 | Gerhardinger et al. |
| 5,626,954 | A | 5/1997 | Andersen et al. |
| 5,631,097 | A | 5/1997 | Andersen et al. |
| 5,637,362 | A | 6/1997 | Chase et al. |
| 5,643,510 | A | 7/1997 | Sucech |
| 5,644,880 | A | 7/1997 | Lehnert et al. |
| 5,648,097 | A | 7/1997 | Nuwayser |
| 5,654,048 | A | 8/1997 | Andersen et al. |
| 5,658,624 | A | 8/1997 | Andersen et al. |
| 5,683,635 | A | 11/1997 | Sucech et al. |
| 5,691,014 | A | 11/1997 | Andersen et al. |
| 5,695,811 | A | 12/1997 | Andersen et al. |
| 5,704,179 | A | 1/1998 | Lehnert et al. |
| 5,705,237 | A | 1/1998 | Andersen et al. |
| 5,705,242 | A | 1/1998 | Andersen et al. |
| 5,714,001 | A | 2/1998 | Savoly et al. |
| 5,714,032 | A | 2/1998 | Ainsley et al. |
| 5,718,785 | A | 2/1998 | Randall |
| 5,718,797 | A | 2/1998 | Phillips et al. |
| 5,723,226 | A | 3/1998 | Francis et al. |
| 5,744,199 | A | 4/1998 | Joffre et al. |
| 5,746,822 | A * | 5/1998 | Espinoza et al. ............... 106/785 |
| 5,749,936 | A | 5/1998 | Humphries et al. |
| 5,753,163 | A | 5/1998 | Sekhar et al. |
| 5,759,037 | A | 6/1998 | Fischer |
| 5,772,846 | A | 6/1998 | Jaffee |
| 5,776,245 | A | 7/1998 | Thomas |
| 5,791,109 | A | 8/1998 | Lehnert et al. |
| 5,797,988 | A | 8/1998 | Linde et al. |
| 5,798,151 | A | 8/1998 | Andersen et al. |
| 5,807,567 | A | 9/1998 | Randolph et al. |
| 5,817,262 | A | 10/1998 | Englert |
| 5,830,319 | A | 11/1998 | Landin |
| 5,830,548 | A | 11/1998 | Andersen et al. |
| 5,837,621 | A | 11/1998 | Kajander |
| 5,837,752 | A | 11/1998 | Shastri et al. |
| 5,855,667 | A | 1/1999 | Thomas |
| 5,879,498 | A | 3/1999 | Lemons |
| 5,882,395 | A | 3/1999 | Linde et al. |
| 5,883,024 | A | 3/1999 | O'Haver-Smith et al. |
| 5,908,521 | A | 6/1999 | Ainsley et al. |
| 5,945,044 | A | 8/1999 | Kawai et al. |
| 5,961,900 | A | 10/1999 | Wedi |
| 5,965,257 | A | 10/1999 | Ahluwalia |
| 5,981,406 | A | 11/1999 | Randall |
| 6,001,496 | A | 12/1999 | O'Haver-Smith |
| 6,027,561 | A * | 2/2000 | Gruber et al. .................. 106/718 |
| 6,054,205 | A | 4/2000 | Newman et al. |
| 6,106,607 | A | 8/2000 | Be et al. |
| 6,110,575 | A | 8/2000 | Haga |
| 6,182,407 | B1 | 2/2001 | Turpin et al. |
| 6,187,697 | B1 | 2/2001 | Jaffee et al. |
| 6,221,521 | B1 | 4/2001 | Lynn et al. |
| 6,254,817 | B1 | 7/2001 | Cooper et al. |
| 6,319,312 | B1 | 11/2001 | Luongo |
| 6,340,388 | B1 | 1/2002 | Luongo |
| 6,342,284 | B1 | 1/2002 | Yu et al. |
| 6,355,099 | B1 | 3/2002 | Immordino et al. |
| 6,365,533 | B1 | 4/2002 | Horner, Jr. et al. |
| 6,391,131 | B1 | 5/2002 | Newman et al. |
| 6,402,779 | B1 | 6/2002 | Colone et al. |
| 6,406,535 | B1 | 6/2002 | Shintone |
| 6,409,824 | B1 | 6/2002 | Veeramasuneni et al. |
| 6,432,482 | B1 | 8/2002 | Jaffee et al. |
| 6,435,369 | B1 | 8/2002 | Poursayadi |
| 6,443,258 | B1 | 9/2002 | Putt et al. |
| 6,465,165 | B2 | 10/2002 | Landry-Coltrain et al. |
| 6,488,792 | B2 * | 12/2002 | Mathieu ......................... 156/40 |
| 6,492,450 | B1 | 12/2002 | Hsu |
| 6,494,609 | B1 | 12/2002 | Wittbold et al. |
| 6,508,895 | B2 | 1/2003 | Lynn et al. |

| | | |
|---|---|---|
| 6,524,679 B2 | 2/2003 | Hauber et al. |
| 6,547,874 B2 | 4/2003 | Eck et al. |
| 6,555,199 B1 | 4/2003 | Jenkines |
| 6,566,434 B1 | 5/2003 | Mayer et al. |
| 6,569,541 B1 | 5/2003 | Martin et al. |
| 6,620,487 B1 | 9/2003 | Tonyan et al. |
| 6,632,550 B1 | 10/2003 | Yu et al. |
| 6,641,658 B1 | 11/2003 | Dubey |
| 6,716,293 B2 | 4/2004 | Taymourian et al. |
| 6,723,670 B2 | 4/2004 | Kajander et al. |
| 6,737,156 B2 | 5/2004 | Koval et al. |
| 6,746,781 B2 | 6/2004 | Francis et al. |
| 6,747,922 B2 | 6/2004 | Kamiyama |
| 6,749,897 B2 | 6/2004 | Naji et al. |
| 6,770,354 B2 | 8/2004 | Randall et al. |
| 6,774,146 B2 | 8/2004 | Savoly et al. |
| 6,800,131 B2 | 10/2004 | Yu et al. |
| 6,800,361 B2 | 10/2004 | Bruce et al. |
| 6,808,793 B2 | 10/2004 | Randall et al. |
| 6,822,033 B2 | 11/2004 | Yu et al. |
| 6,838,163 B2 | 1/2005 | Smith et al. |
| 6,866,492 B2 | 3/2005 | Hauber et al. |
| 6,869,474 B2 | 3/2005 | Perez-Pena et al. |
| 6,874,930 B2 | 4/2005 | Wittbold et al. |
| 6,875,308 B2 | 4/2005 | Kajander et al. |
| 6,878,321 B2 | 4/2005 | Hauber et al. |
| 6,902,615 B2 | 6/2005 | Shoshany |
| 6,907,928 B2 * | 6/2005 | Di Lullo Arias et al. ..... 166/292 |
| 6,913,819 B2 | 7/2005 | Wallner |
| 6,916,863 B2 | 7/2005 | Hemmings et al. |
| 6,932,863 B2 | 8/2005 | Shoshany |
| 6,946,504 B2 | 9/2005 | Sinnige |
| 6,995,098 B2 | 2/2006 | McGrady et al. |
| 7,045,474 B2 | 5/2006 | Cooper et al. |
| 7,056,582 B2 | 6/2006 | Carbo et al. |
| 7,235,288 B2 | 6/2007 | Kajander et al. |
| 7,244,304 B2 | 7/2007 | Yu et al. |
| 7,300,515 B2 | 11/2007 | Porter |
| 7,338,702 B2 | 3/2008 | Swales et al. |
| 7,347,895 B2 | 3/2008 | Dubey |
| 7,364,676 B2 | 4/2008 | Sucech et al. |
| 7,399,718 B2 | 7/2008 | Neumann et al. |
| 7,407,545 B2 | 8/2008 | Wallner |
| 7,413,603 B2 | 8/2008 | Miller et al. |
| 7,435,369 B2 | 10/2008 | Hennis et al. |
| 7,468,154 B2 | 12/2008 | Dubey |
| 7,473,440 B2 | 1/2009 | Kajander |
| 7,520,948 B2 | 4/2009 | Tavy et al. |
| 7,524,386 B2 | 4/2009 | George et al. |
| 7,553,780 B2 | 6/2009 | Smith |
| 7,635,657 B2 | 12/2009 | Bland et al. |
| 7,637,996 B2 | 12/2009 | Blackburn et al. |
| 7,645,829 B2 | 1/2010 | Tse et al. |
| 7,704,316 B2 | 4/2010 | Naji et al. |
| 7,732,032 B2 | 6/2010 | Dubey |
| 7,740,700 B2 | 6/2010 | Wallner |
| 7,749,928 B2 | 7/2010 | Smith et al. |
| 7,763,134 B1 | 7/2010 | Kumar |
| 7,767,019 B2 | 8/2010 | Liu et al. |
| 7,776,461 B2 | 8/2010 | Blackburn et al. |
| 7,776,462 B2 | 8/2010 | Liu et al. |
| 7,790,240 B2 | 9/2010 | Zheng |
| 7,794,221 B2 | 9/2010 | Dubey |
| 7,803,226 B2 | 9/2010 | Wang et al. |
| 7,811,685 B2 | 10/2010 | Wang et al. |
| 7,815,730 B2 | 10/2010 | Wang et al. |
| 7,829,488 B2 | 11/2010 | Bennett |
| 7,833,638 B2 | 11/2010 | Zheng et al. |
| 7,846,278 B2 | 12/2010 | Porter |
| 7,846,536 B2 | 12/2010 | Dubey |
| 7,879,144 B2 | 2/2011 | Hemmings et al. |
| 7,892,472 B2 | 2/2011 | Veeramasuneni et al. |
| 8,030,377 B2 | 10/2011 | Dubey et al. |
| 8,038,790 B1 | 10/2011 | Dubey et al. |
| 8,039,774 B2 | 10/2011 | Dubey |
| 8,061,257 B2 | 11/2011 | Tonyan et al. |
| 8,088,218 B2 | 1/2012 | Blackburn et al. |
| 2001/0009834 A1 | 7/2001 | Peng et al. |
| 2002/0045074 A1 | 4/2002 | Yu et al. |
| 2002/0151240 A1 | 10/2002 | Smith et al. |
| 2002/0155282 A1 | 10/2002 | Randall et al. |
| 2003/0031854 A1 | 2/2003 | Kajander et al. |
| 2003/0032350 A1 | 2/2003 | Kajander et al. |
| 2003/0054714 A1 | 3/2003 | Peng et al. |
| 2003/0114065 A1 | 6/2003 | Peng et al. |
| 2003/0119408 A1 | 6/2003 | Choi |
| 2003/0129903 A1 | 7/2003 | Moes |
| 2003/0134079 A1 | 7/2003 | Bush et al. |
| 2003/0134554 A1 | 7/2003 | Halm et al. |
| 2003/0139111 A1 | 7/2003 | Kajander et al. |
| 2003/0175478 A1 | 9/2003 | Leclercq |
| 2003/0203191 A1 | 10/2003 | Randall et al. |
| 2003/0211305 A1 | 11/2003 | Koval et al. |
| 2004/0033749 A1 | 2/2004 | Smith et al. |
| 2004/0043682 A1 | 3/2004 | Taylor et al. |
| 2004/0083927 A1 | 5/2004 | Shoshany |
| 2004/0083928 A1 | 5/2004 | Shoshany |
| 2004/0084127 A1 | 5/2004 | Porter |
| 2004/0134585 A1 | 7/2004 | Callais et al. |
| 2004/0142618 A1 | 7/2004 | Porter |
| 2004/0166751 A1 | 8/2004 | Peng et al. |
| 2004/0198116 A1 | 10/2004 | Peng et al. |
| 2004/0209074 A1 | 10/2004 | Randall et al. |
| 2004/0231916 A1 | 11/2004 | Englert et al. |
| 2004/0266303 A1 | 12/2004 | Jaffee |
| 2004/0266304 A1 | 12/2004 | Jaffee |
| 2005/0019618 A1 | 1/2005 | Yu et al. |
| 2005/0070186 A1 | 3/2005 | Shoemake et al. |
| 2005/0103262 A1 | 5/2005 | Bush et al. |
| 2005/0112977 A1 | 5/2005 | Choi |
| 2005/0136241 A1 | 6/2005 | Kajander et al. |
| 2005/0142348 A1 | 6/2005 | Kajander et al. |
| 2005/0181693 A1 | 8/2005 | Kajander |
| 2005/0202223 A1 | 9/2005 | Harima et al. |
| 2005/0202227 A1 | 9/2005 | Kajander |
| 2005/0202258 A1 | 9/2005 | Swales et al. |
| 2005/0202742 A1 | 9/2005 | Smith et al. |
| 2005/0221705 A1 | 10/2005 | Hitch |
| 2005/0233657 A1 | 10/2005 | Grove et al. |
| 2005/0266225 A1 | 12/2005 | Currier et al. |
| 2006/0010786 A1 | 1/2006 | Rogers |
| 2006/0035112 A1 | 2/2006 | Veeramasuneni et al. |
| 2006/0054059 A1 | 3/2006 | Dubey et al. |
| 2006/0065342 A1 | 3/2006 | Porter |
| 2006/0217017 A1 | 9/2006 | Tavy et al. |
| 2006/0240236 A1 | 10/2006 | Bland et al. |
| 2006/0252328 A1 | 11/2006 | Bingenheimer |
| 2006/0272764 A1 | 12/2006 | Smith |
| 2007/0022913 A1 | 2/2007 | Wang et al. |
| 2007/0026578 A1 | 2/2007 | Kim et al. |
| 2007/0042657 A1 | 2/2007 | Bush et al. |
| 2007/0056478 A1 | 3/2007 | Miller et al. |
| 2007/0093159 A1 | 4/2007 | Kajander |
| 2007/0148430 A1 | 6/2007 | Agrawal |
| 2007/0149078 A1 | 6/2007 | Nandi et al. |
| 2007/0149083 A1 | 6/2007 | Agrawal |
| 2007/0197114 A1 | 8/2007 | Grove et al. |
| 2008/0003903 A1 | 1/2008 | Nandi |
| 2008/0057318 A1 | 3/2008 | Adzima et al. |
| 2008/0118735 A1 | 5/2008 | Kanao |
| 2008/0152945 A1 | 6/2008 | Miller et al. |
| 2008/0176050 A1 | 7/2008 | Lintz et al. |
| 2008/0190062 A1 | 8/2008 | Engbrecht et al. |
| 2008/0261041 A1 | 10/2008 | Thomas et al. |
| 2009/0011207 A1 | 1/2009 | Dubey |
| 2009/0029141 A1 | 1/2009 | Shake et al. |
| 2009/0075541 A1 | 3/2009 | Zheng et al. |
| 2009/0084514 A1 | 4/2009 | Smith et al. |
| 2009/0085253 A1 | 4/2009 | Kruss |
| 2009/0087616 A1 | 4/2009 | Hennis et al. |
| 2009/0124151 A1 | 5/2009 | Shoemake |
| 2009/0155603 A1 | 6/2009 | Zheng et al. |
| 2009/0173423 A1 | 7/2009 | Jaffee |
| 2009/0186549 A1 | 7/2009 | Bennett |
| 2009/0202716 A1 | 8/2009 | Grove et al. |
| 2009/0208704 A1 | 8/2009 | Diwanji et al. |
| 2009/0208714 A1 | 8/2009 | Currier et al. |
| 2009/0223618 A1 | 9/2009 | Smith |

| | | | |
|---|---|---|---|
| 2009/0239087 A1 | 9/2009 | Wang et al. | |
| 2009/0275250 A1 | 11/2009 | Smith et al. | |
| 2009/0297865 A1 | 12/2009 | Hauber et al. | |
| 2010/0048080 A1 | 2/2010 | Bland et al. | |
| 2010/0055431 A1 | 3/2010 | College | |
| 2010/0055439 A1 | 3/2010 | Lee et al. | |
| 2010/0055477 A1 | 3/2010 | Wang et al. | |
| 2010/0062264 A1 | 3/2010 | Hayes et al. | |
| 2010/0087114 A1 | 4/2010 | Bush et al. | |
| 2010/0143682 A1 | 6/2010 | Shake et al. | |
| 2011/0166256 A1 | 7/2011 | Gallez et al. | |
| 2011/0195241 A1 | 8/2011 | Yu et al. | |
| 2011/0196070 A1 | 8/2011 | Keller et al. | |
| 2011/0203487 A1 | 8/2011 | Aberle et al. | |
| 2011/0296794 A1 | 12/2011 | Thomas et al. | |

FOREIGN PATENT DOCUMENTS

| | | |
|---|---|---|
| EP | 1 801 278 A1 | 6/2007 |
| GB | 585627 A | 2/1947 |
| GB | 672829 A | 5/1952 |
| GB | 735405 A | 8/1955 |
| GB | 736257 | 9/1955 |
| GB | 772581 | 4/1957 |
| GB | 833800 | 4/1960 |
| GB | 873805 | 7/1961 |
| GB | 1064462 | 4/1967 |
| GB | 1170079 | 11/1969 |
| GB | 1197221 | 7/1970 |
| GB | 1250713 A | 10/1971 |
| GB | 1498030 | 1/1978 |
| GB | 2004807 A | 4/1979 |
| GB | 2007153 A | 5/1979 |
| GB | 2 013 563 A | 8/1979 |
| GB | 2 023 687 A | 1/1980 |
| GB | 1581396 A | 12/1980 |
| GB | 2 053 779 A | 2/1981 |
| GB | 2141456 A | 12/1984 |
| GB | 2142674 A | 1/1985 |
| GB | 2 433 497 A | 6/2007 |
| JP | 53-135125 A | 11/1978 |
| JP | 07-330410 | 12/1995 |
| JP | 07-330411 A | 12/1995 |
| JP | 08-232442 A | 9/1996 |
| JP | 09-142915 D1 | 3/1997 |
| JP | 11-300882 A | 11/1999 |
| NZ | 155679 A | 12/1971 |
| RU | 2044714 C1 | 9/1995 |
| RU | 2058955 C1 | 4/1996 |
| RU | 94030472 A1 | 6/1996 |
| RU | 2210553 C2 | 8/2003 |
| SU | 967984 A | 10/1982 |
| SU | 1052492 A | 11/1983 |
| WO | WO 80/02086 A1 | 10/1980 |
| WO | WO 93/04009 | 3/1993 |
| WO | WO 99/08979 | 2/1999 |
| WO | WO 00/06518 | 2/2000 |
| WO | WO 01/45932 A1 | 6/2001 |
| WO | WO 01/53075 A1 | 7/2001 |
| WO | WO 2006/113379 A2 | 10/2006 |
| WO | WO 2007/005041 A1 | 1/2007 |
| WO | WO 2007/009935 A2 | 1/2007 |
| WO | WO 2008/066746 A2 | 6/2008 |
| WO | WO 2009/007994 A2 | 1/2009 |
| WO | WO 2010/036505 A2 | 4/2010 |

OTHER PUBLICATIONS

International Search Report from PCT/US2006/021793, published as WO 2007/018705 A3 on Aug. 7, 2008.

International Search Report from PCT/US2005/026345, published as WO 2006/020369 A3 on Jul. 5, 2007.

Grodzka, P. et al.; On the Development of Heat Storage Building Materials; Conf-820814-23; DE82 020814; Library of Congress Newspaper RM.

Hannant, D.J. et al.; Polyolefin Fibrous Networks in Cement Matrices for Low Cost Sheeting; Phil. Trans. R. Soc. Land; 1980; pp. 591-597; A 294; Civil Engineering Department Univ. of Surrey, Guildford, Surrey GU2 5XH, U.K.

Karni, J.; Thin Gypsum Panels; Materiaux et Constructions; 1980; pp. 383-389; vol. 13, No. 77; Bordas-Dunod; Israel.

Salyer, Ivan O et al.; Utilization of Bagasse in New Composite Building Materials; Ind. Eng. Chem. Prod. Res. Dev. 1982; pp. 17-23; 21; Center for Basic and Applied Polymer Research, Univ. of Dayton, OH 45469.

Weber, Charles, G.; Fiber Building Boards Their Manufacture and Use; Industrial and Engineering Chemistry; Aug. 1935; pp. 896-898; vol. 27, No. 8; National Bureau of Standards, Washington, D.C.

* cited by examiner

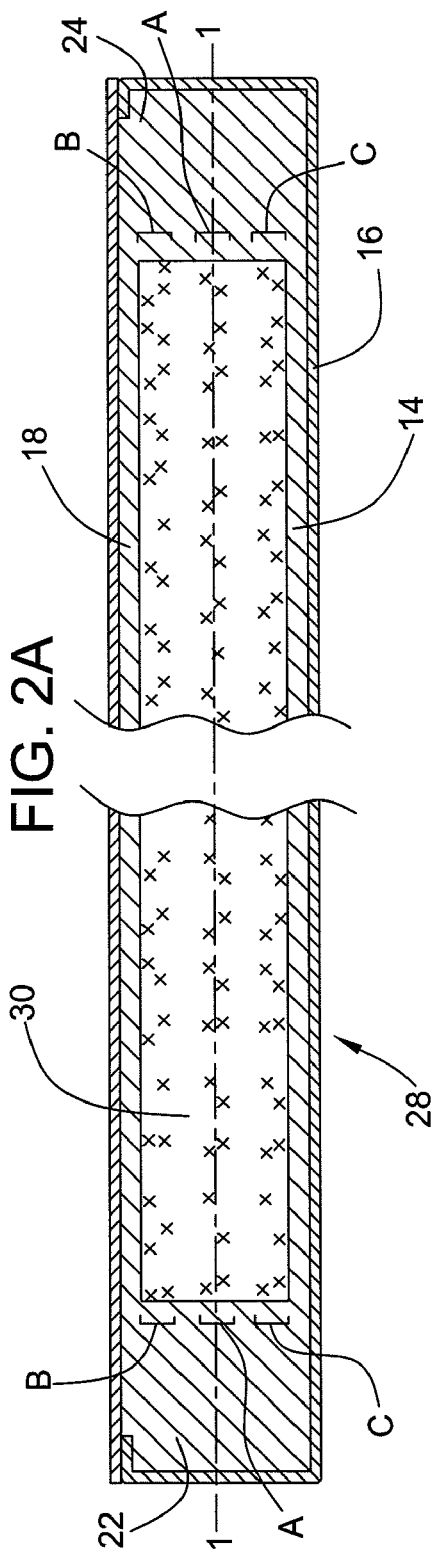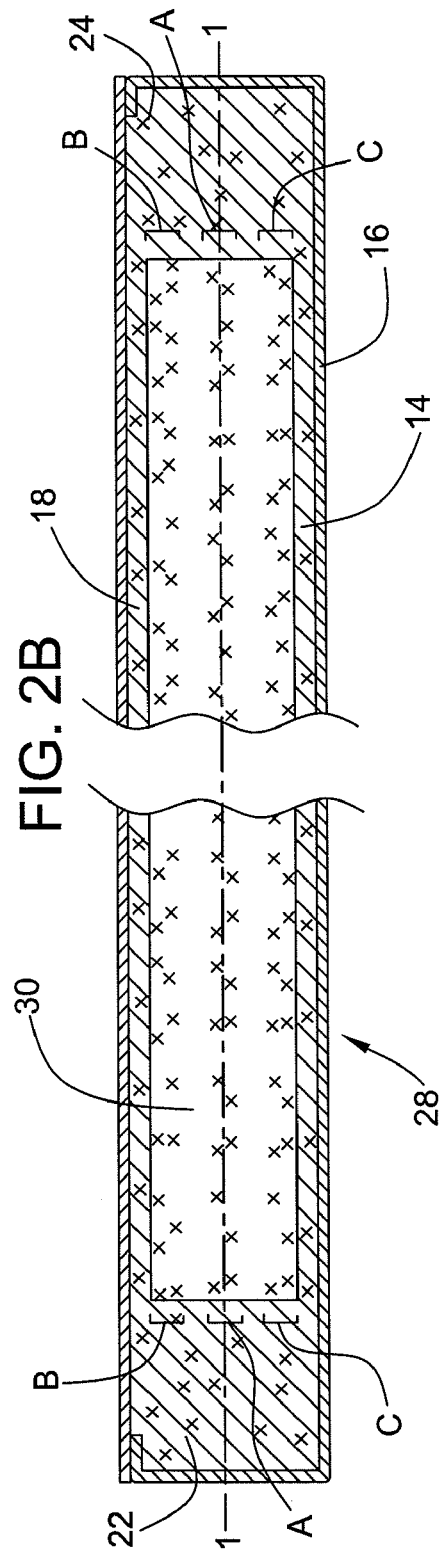

CEMENTITIOUS ARTICLE AND METHOD FOR PREPARING THE SAME

BACKGROUND OF THE INVENTION

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677. Set gypsum is also included in products that fill and smooth the joints between edges of gypsum board (see, e.g., U.S. Pat. No. 3,297,601). Also, many specialty materials, such as materials useful for modeling and mold-making that are precisely machined, produce products that contain major amounts of set gypsum. Typically, such gypsum-containing cementitious products are made by preparing a mixture of calcined gypsum (calcium sulfate alpha or beta hemihydrate and/or calcium sulfate anhydrite), water, and other components, as appropriate to form a cementitious slurry. In the manufacture of cementitious articles, the cementitious slurry and desired additives are often blended in a continuous mixer, as for example described in U.S. Pat. No. 3,359,146.

The mixture is cast into a desired shape or onto a surface, and then allowed to harden to form set (i.e., rehydrated) gypsum by reaction of the calcined gypsum with water to form a matrix of crystalline hydrated gypsum (calcium sulfate dihydrate). It is the desired hydration of the calcined gypsum that enables the formation of an interlocking matrix of set gypsum crystals, thereby imparting strength to the gypsum structure in the gypsum containing product. Mild heating is utilized to drive off the remaining (i.e., unreacted) water to yield a dry product.

Cementitious products, while generally durable, can nevertheless be improved by enhancing the strength (e.g., compressive strength) thereof to make them more resistant to stresses encountered during use. For example, many cementitious products can be susceptible to indentations or other damage during wear and tear.

In the case of cementitious board, they are manufactured such that a layer of mixed cementitious slurry is continuously deposited on a sheet of facer material moving beneath the mixer. A second sheet of facer material is usually applied to the top of the slurry. The cementitious slurry sandwiched between the two facer materials is allowed to at least partially set prior to being subjected to further processing, such as cutting the board to desired length, and heating to evaporate residual excess water.

The facer materials include paper in some applications, such as in the case of conventional wallboard. While paper adheres to the cementitious component of the wallboard with relative ease, one drawback with paper is that it is less resistant to moisture. Thus, particularly in applications where water resistance is desirable, other facer materials, such as fibrous mats (including meshes), can be used. While such facer materials provide better moisture resistance properties, they may not be fully satisfactory because they may lack interfacial adhesive strength between the cementitious component and the facer material that may otherwise be achieved when a paper facer material is used. A cementitious component formulation that enables enhanced interfacial adhesion to facer materials is desirable to thereby improve the performance of the finished product.

Thus, there is a need for cementitious articles with improved strength (e.g., compressive strength) particularly in the cementitious component. There is also a need for cementitious board panels having improved interfacial binding between the facer material and the cementitious component.

BRIEF SUMMARY OF THE INVENTION

In one aspect, the present invention provides a method of preparing a cementitious article comprising: (a) preparing a cementitious slurry, the cementitious slurry comprising cementitious material, a polyvinyl acetate type polymer, a monobasic phosphate, optionally boric acid, and water; and (b) allowing the slurry to set. In some embodiments where the article is board, the method further comprises depositing the cementitious slurry onto an advancing sheet of facer material. The cementitious slurry can form the core of the article or a dense layer as described below. In some embodiments, the facer material comprises glass fiber, polymer fiber, paper fiber, mineral fiber, organic fiber, or a combination thereof.

In another aspect, the present invention provides a cementitious article comprising: (a) a cementitious component comprising cementitious material, a polyvinyl acetate type polymer, a monobasic phosphate, and optionally boric acid; and (b) a first surface of the component, a second surface of the component, and a central region of the component, overlapping a central axis, halfway between the first surface and the second surface; wherein the total concentration of the polyvinyl acetate type polymer, monobasic phosphate, and boric acid, in each of one or both regions in the component adjacent the first and second surfaces, respectively, is greater than the total concentration of the polyvinyl acetate type polymer, monobasic phosphate, and boric acid in the central region of the component.

In yet another aspect, the present invention provides a cementitious article comprising a cementitious component comprising cementitious material, a polyvinyl acetate type polymer, a monobasic phosphate, and optionally boric acid. The article can be in the form of various board products, with or without lining, or other articles.

These and other advantages of the present invention, as well as additional inventive features, will be apparent from the description of the invention provided herein.

BRIEF DESCRIPTION OF THE SEVERAL VIEWS OF THE DRAWING(S)

FIGS. 1A and 1B schematically illustrate the cross section of cementitious board in accordance with some embodiments of the invention.

FIGS. 2A and 2B schematically illustrate the cross section of cementitious board in accordance with some embodiments of the invention.

DETAILED DESCRIPTION OF THE INVENTION

Figure 1A:
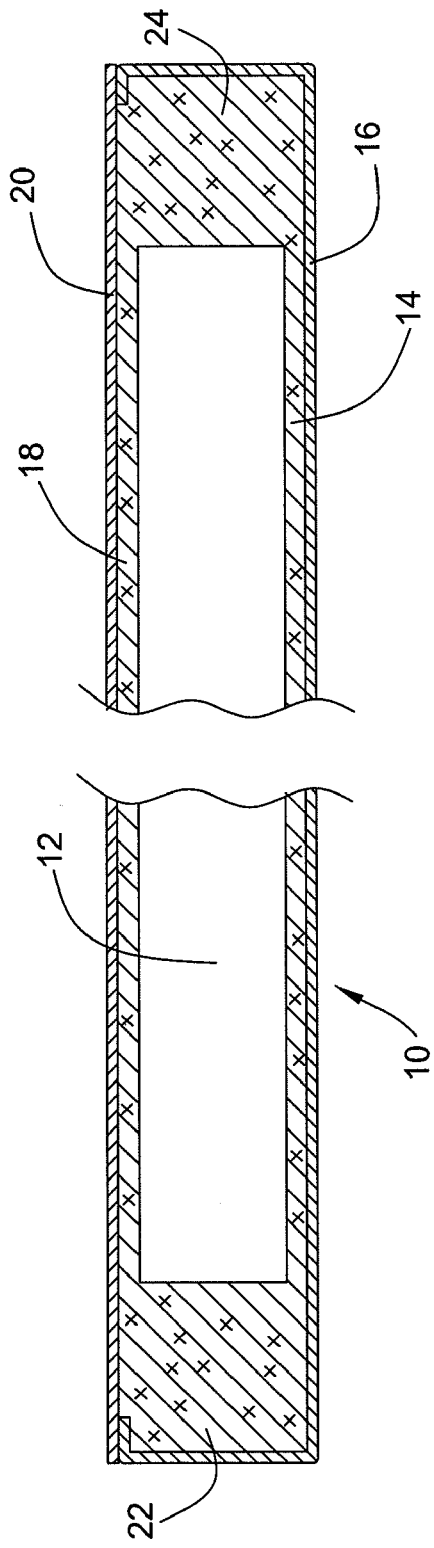

The present invention is predicated, at least in part, on the surprising and unexpected discovery of a cementitious article, and method of manufacture thereof, comprising a unique combination of additives that enhance strength (e.g., compressive strength), and in board applications, interfacial binding. The inventive additives are a polyvinyl acetate type polymer, a monobasic phosphate, and optionally boric acid. While not wishing to be bound by any particular theory, surprisingly, the additives according to the invention are believed to synergistically enhance crosslinking of the polyvinyl acetate type polymer and coat on, bind to, or otherwise interact with gypsum crystals to provide the enhanced strength and interfacial binding. In some embodiments, all three ingredients, including the boric acid, are included to further enhance the synergistic crosslinking effect. The article can be in the form of various cementitious board products, lined or unlined, as well as other cementitious articles such as plaster, joint compound, statuary, figurines, molds, flooring products such as underlayment, ceiling material, wall material, or the like.

As used herein, the term "component" refers to the portion or the entirety of the cementitious board or other cementitious article that comprises a cementitious material, polyvinyl acetate type polymer, a monobasic phosphate, and optionally boric acid. Thus, when referring to board, the term "component" can refer to one or more dense layers, the board core, or both. With reference to non-board articles, the term "component" can refer to the entirety of the article if made of a cementitious material, or to any portion(s) of the cementitious article that comprises a cementitious material, polyvinyl acetate type polymer, a monobasic phosphate, and optionally boric acid. For example, the "component" can be a cementitious outer layer of the article, the core of the article or both.

As used herein "core" refers to a portion of a cementitious article that comprises a cementitious material, polyvinyl acetate type polymer, a monobasic phosphate, and optionally boric acid. The portion may be partially or entirely enclosed, bounded, or bordered by one or more outer layers that may or may not be cementitious. For example, with respect to a board, the term "core" refers to the cementitious portion of the board that is disposed between the facer materials, as is well understood in the art.

In one aspect of the invention, in the manufacture of board, the inventive additives are included in a cementitious slurry that also comprises a cementitious material and water. Board in accordance with the invention can be prepared in any suitable manner. For example, cementitious slurry is applied to a first advancing facer material as is well understood in the art. As one of ordinary skill in the art will appreciate, board products are typically formed "face down" such that the first facer material serves as the "face" of the board after it is installed. In some embodiments, a second facer material, which can be the same or different from the first facer material, can be applied on top of the cementitious slurry so that the slurry is sandwiched between the facer materials as is known. The second facer material generally corresponds with the back of the board when installed. The cementitious slurry is allowed to set or harden into a set cementitious core while supported by the first facer material, cut to length in one or more steps, inverted as desired, and heated (e.g., in a kiln) to remove excess water, as is well within the skill of the ordinary artisan. In accordance with an aspect of the present invention, additives according to the invention also surprisingly impart enhanced interfacial binding between the set cementitious core and the facer material(s) after the setting process and in the final product. Without wishing to be bound by any particular theory, it is believed that enhanced strength (e.g., compressive strength) in the core allows for the enhanced interfacial binding to the facer material(s).

Figure 1B:
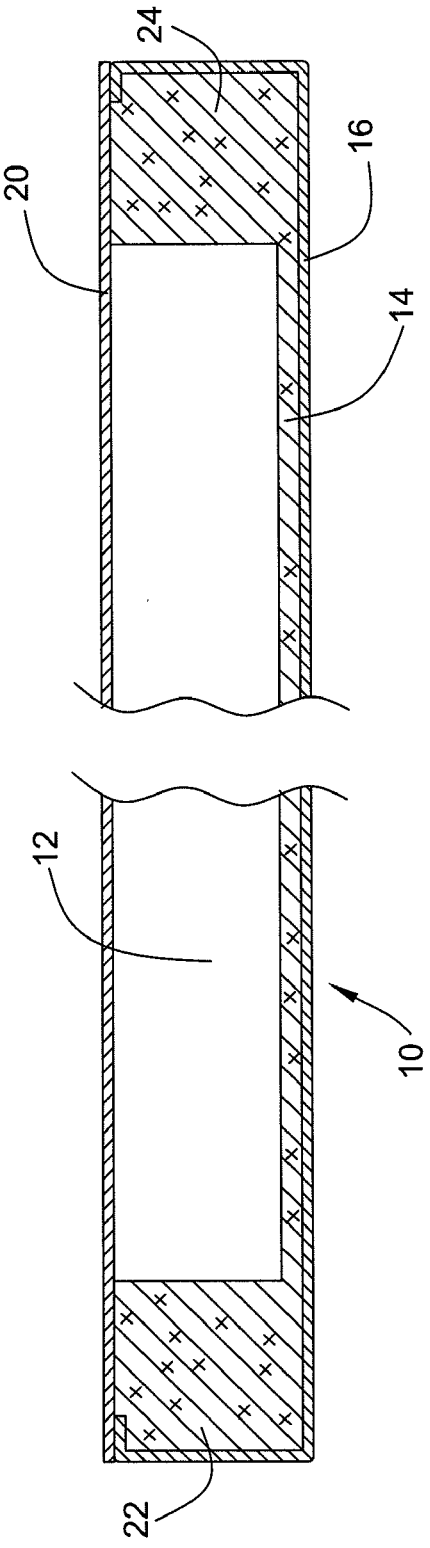

As shown in FIGS. 1A and 1B, which are not drawn to scale, exemplary cementitious board 10, according to an aspect of the present invention, includes a cementitious core 12 that is formed from a cementitious slurry that includes cementitious material, water, and commonly known optional additives including, without limitation, foaming agents, accelerators, retarders, etc., and combinations thereof. If desired, the cementitious board can include a first dense layer 14 as is commonly known, between the cementitious core 12 and a first facer material 16. The dense layer 14 is formed from a dense cementitious slurry as is known in the art. If desired, a second dense layer 18 formed from a second dense cementitious slurry can be optionally applied between the core 12 and the second facer material 20 if present, as shown in FIG. 1A. The first and second dense layers 14 and 18 can be formed from dense cementitious slurries of the same or different composition, although having the same composition for both dense layers adds efficiency to the manufacturing process. In some embodiments, as shown in FIG. 1A, the polyvinyl acetate type polymer, monobasic phosphate, and optionally boric acid, are included in the dense layers 14 and 18 and thus are included into the dense cementitious slurries used in forming the dense layers 14 and 18. FIG. 1B shows board 10 without the second dense layer in accordance with some embodiments of the invention. The board 10 can be made with hard edges 22 and 24 if desired. As is known in the art, hard edges 22 and 24 can be formed from the same dense slurry as forms the dense layer 14, such as by directing portions of the dense slurry around the ends of a roller used to apply the dense layer 14.

In embodiments of the invention without any dense layer, the inventive additives, namely, the polyvinyl acetate type polymer, monobasic phosphate, and optionally boric acid, are included in the cementitious core formed from the cementitious core slurry. In embodiments including one or both of the dense layers, the polyvinyl acetate type polymer, monobasic phosphate, and optionally boric acid, can be included in either or both of the dense layers and/or in the cementitious core. Desirably, the inventive additives are particularly present at or near the facer materials. The presence of the inventive additives at the interface between the core and the facer material(s) is desirable for enhancing interfacial binding between the core and the facer material(s). The presence of additives according to the invention at or near the facer materials is also beneficial (particularly at or near the first facer material) to enhance withstanding external surface stresses such as nailing, denting, or deformation. Thus, in some embodiments that include one or both dense layers, it is desirable to include the inventive additives in one or both of the dense layer slurries. It is also possible in some embodiments that include one or more dense layers to include additives according to the invention solely in the core, and not in the dense layer(s). In some of such embodiments, the additives may migrate in the core toward the dense layers.

Figure 3:
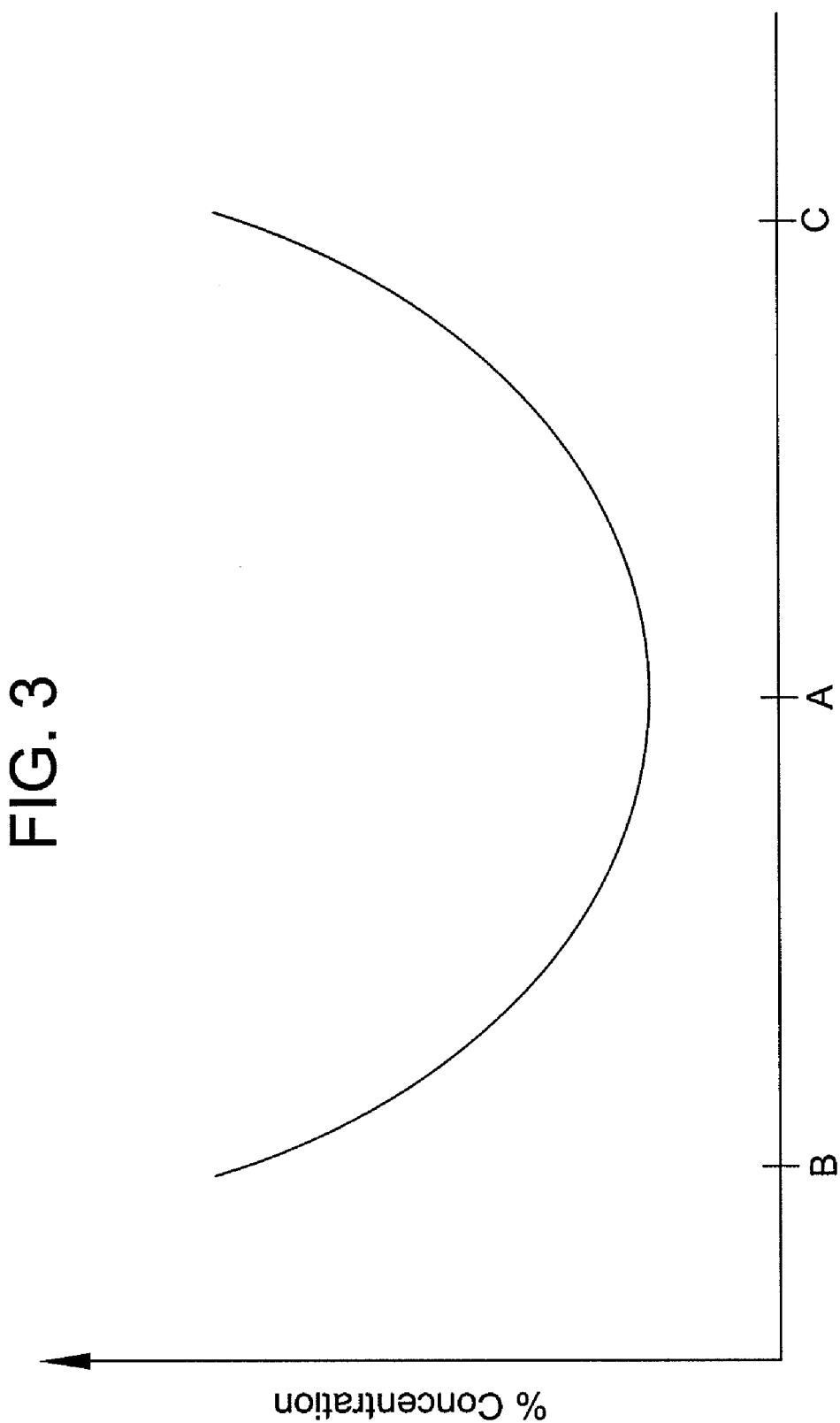
FIG. 3 is a graph illustrating the relative amount of the polyvinyl acetate type polymer, monobasic phosphate, and optionally boric acid in various portions of the cementitious board in accordance with some embodiments of the invention.
Figure 4:
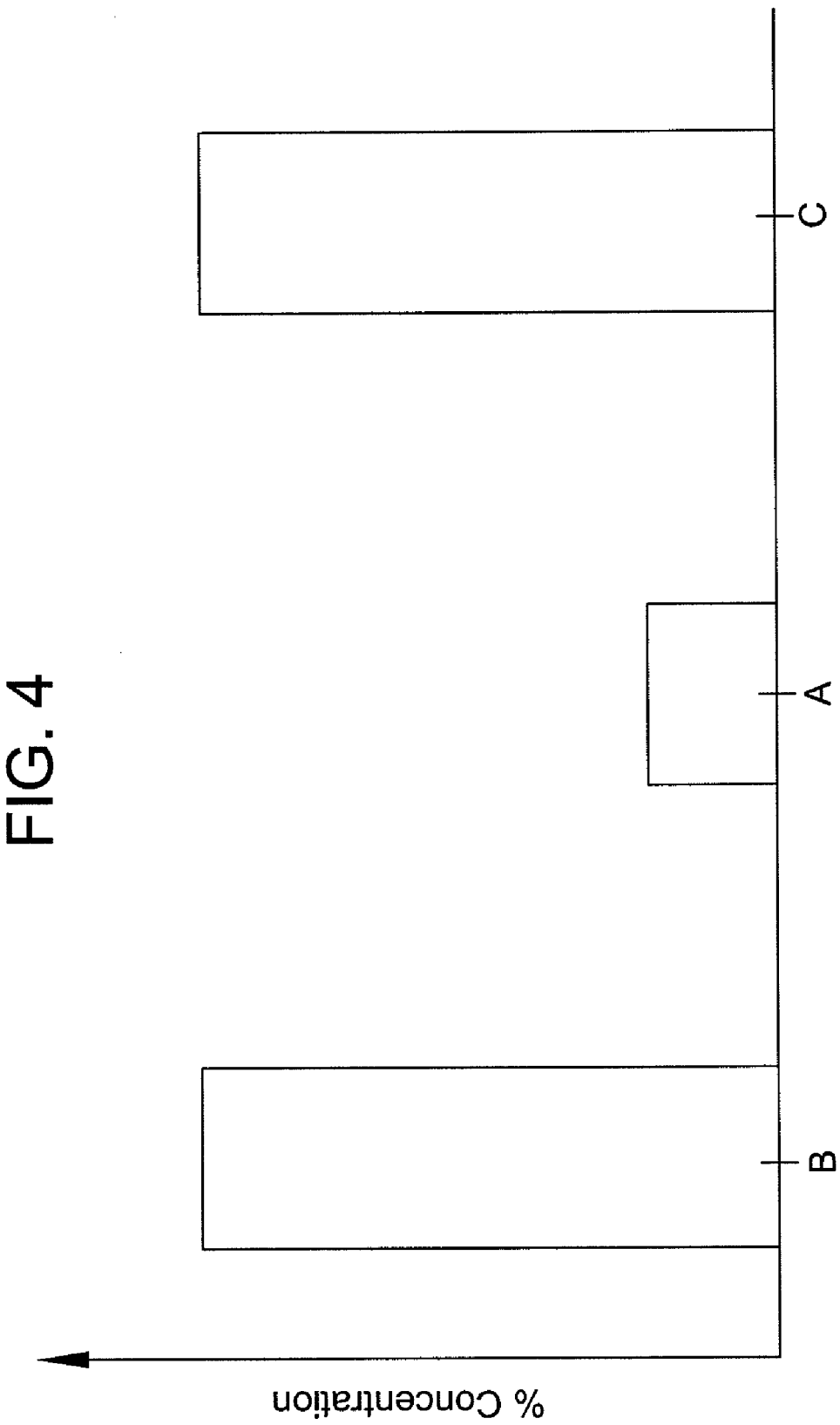
FIG. 4 is a bar graph illustrating the relative amount of the polyvinyl acetate type polymer, monobasic phosphate, and optionally boric acid in various portions of the cementitious board in accordance with some embodiments of the invention.

In some embodiments, the inventive additives are included in the core. As seen in FIGS. 2-4, in some such embodiments a concentration differential is formed. For example, as seen in the exemplary board 28 of FIGS. 2A and 2B, which are not drawn to scale, the total amount of the polyvinyl acetate type polymer, monobasic phosphate, and optionally boric acid is of higher concentration in each of peripheral regions B and C, respectively, as compared with in central region A. It is to be noted that peripheral regions B and C represent the areas of the cementitious core that are closest to the facer materials 20 and 16, while central region A overlaps a central axis 1 wherein the concentration of the inventive additives is lowest. Central region A, and peripheral regions B and C form crosssectional bands across the core in a thickness of about ⅛ inch. The bands A, B, and C are recited herein to illustrate the concentration differential in accordance with some embodiments of the invention.

FIG. 2A illustrates embodiments of the invention where the inventive additives are included in the core 30 but not in the dense layers 14 and 18. FIG. 2B illustrates embodiments of the invention where the inventive additives are included in the core 30 and also in the dense layers 14 and 18. It is possible also to include the inventive additives in the core 30 as well as in only one of the dense layers 14 or 18.

In some embodiments, the concentration of the polyvinyl acetate type polymer, monobasic phosphate, and optionally boric acid can generally gradually increase from central region A to each of peripheral regions B and C, respectively. By way of illustrative example only, and not any limitation, FIG. 3 shows one embodiment where there is a gradual increase in concentration of the inventive additives from the central region A to each of peripheral regions B and C, respectively, of the cementitious core. However, it will be understood that the general gradual increase in concentration can deviate from the curve shown in FIG. 3, and in some embodiments can be discontinuous, while still generally gradually increasing from central region A to peripheral regions B and C, respectively. The concentration differential can be, for example, a linear, quadratic, exponential, discontinuous or other type of distribution. FIG. 4 illustrates the higher total amount of the polyvinyl acetate type polymer, monobasic phosphate, and boric acid if present, in peripheral regions B and C, as compared within central region A, regardless of the type of distribution from central region A to peripheral regions B and C.

In some embodiments, the polyvinyl acetate type polymer, monobasic phosphate, and optionally, boric acid, are present in each of peripheral regions B and C in a concentration that is at least about 1.5× (referred to herein as a "concentration factor") the amount in central region A. It is to be noted that the concentration factor of the polyvinyl acetate type polymer, monobasic phosphate, and optionally boric acid, in peripheral region B can be the same or different from the concentration factor of the polyvinyl acetate type polymer, monobasic phosphate, and optionally boric acid in peripheral region C. In one aspect, the concentration factor in each of regions B and C is at least about 2× that of central region A.

In some embodiments, the article can be prepared such that one or more of the polyvinyl acetate type polymer, monobasic phosphate, and optionally boric acid migrate towards peripheral regions B and/or C, e.g., as a result of the drying process when excess water in the cementitious core leaves the core through regions B and/or C through evaporation. Further, it is believed that the density of different regions of the core and/or cementitious article, as well as the structure and interactions of the gypsum crystals, may also impact the migration characteristics of the inventive additives. For example, the inventive additives may migrate more readily through portions of the core that have a relatively low density, thereby resulting in a higher concentration of the inventive additives at one or more peripheries of a region with lower density than other peripheries or regions. Thus, as one of ordinary skill in the art will appreciate, it is possible to engineer to what degree, and in which region(s) of the core the inventive additives may have a relatively high concentration as compared with other regions of the core having a relatively low concentration of the inventive additives. In some embodiments, the additives also migrate toward edges 22 and 24. In some embodiments, the cementitious core 30 comprises a polyvinyl acetate type polymer, a monobasic phosphate, and optionally boric acid, that is spread throughout the cementitious core. The presence of the additives in regions B and C is advantageous to enhance interfacial binding between the cementitious core and facer layers, and also to enhance durability of the product to withstand physical stresses.

Cementitious products according to the invention can be used in any suitable application, such as a board used as indoor or outdoor building material. For example, board according to the invention include acoustical panels (such as ceiling tiles), wallboard, cubicle partitions, flooring panels, floor underlayment, roofing panels, outdoor sheathing panels, molding material, tile backers, and mold resistant products. Because of the higher compressive strength imparted by the unique combination of inventive additives, board according to the invention have particular utility in environments where the product is exposed to external stresses (such as in the case of, for example, walls; ceilings; and/or floor underlayment such as used in areas of high traffic such as shopping centers, hospitals, office areas, dormitories, and the like), as well as applications in which the enhanced interfacial binding of the board core to facer layer(s) is beneficial such as in mat-faced board, e.g., as used in environments subject to moisture such as outdoor sheathing, bathroom walls, and the like.

In accordance with the present invention, any suitable facer material can be used. For example, paper facer sheet, such as manila paper or kraft paper, can be used as the facer material in some embodiments as is typical with certain products, such as with ceiling panels, wallboard, and cubicle partitions. In some embodiments where the board may be exposed to a substantial amount of moisture, suitable facer material includes a mat, such as a fibrous mat. As used herein, the term "mat" includes mesh materials. Fibrous mats can include any suitable fibrous mat material. For example, in some embodiments, the facer material can be a mat made from glass fiber, polymer fiber, mineral fiber, organic fiber, or the like or combinations thereof. Polymer fibers include, but are not limited to, polyamide fibers, polyaramide fibers, polypropylene fibers, polyester fibers (e.g., polyethylene teraphthalate (PET)), polyvinyl alcohol (PVOH), and polyvinyl acetate (PVAc). Examples of organic fibers include cotton, rayon, and the like. In some embodiments, the facer material is a fibrous glass mat.

Fibrous mats for use with cementitious board are commercially available in many forms, such as woven or non-woven mats. Non-woven mats, which typically comprise fibers bound together by a binder, are preferred. The binder can be any binder typically used in the mat industry, such as urea formaldehyde, melamine formaldehyde, stearated melamine formaldehyde, polyester, acrylics, polyvinyl acetate, urea or melamine formaldehyde modified or blended with polyvinyl acetate or acrylic, styrene acrylic polymers, and the like, or combinations thereof.

The fibers of the mat can be hydrophobic or hydrophilic. They can also be coated or uncoated. Selecting a suitable type of fibrous mat will depend, in part, on the type of application in which the cementitious board is to be used. For example, when the cementitious board is used for applications that require water resistance, hydrophobic fibers should be used in the fibrous mat. In some embodiments, the fibers of the mat are not substantially embedded in the cementitious core. In other embodiments, less than about 50% of the thickness of the mat is embedded in the cementitious core. More or less than 50% of the mat may be embedded in the cementitious core, as desired.

In embodiments where there are two facer materials, the second facer material can be the same as the first facer material, both in material and orientation relative to the cementitious core, or has sufficiently similar expansion and contraction properties, and/or bond characteristics as the first facer material, such that warping of the cementitious article is reduced or eliminated. In embodiments where the second facer material is the same as the first facer material, it should be understood that the first and second facer materials can be provided, for example, in separate rolls or by a single continuous piece of material, for example, by folding a single piece of facer material such that it wraps around the cementitious core.

In some embodiments, the cementitious board is absent any facer material, such as, for example, DUROCK® cement board commercially available from USG Corporation. The cementitious board comprises a cementitious core, a cementitious material, a polyvinyl acetate type polymer, a monobasic phosphate, and optionally boric acid. The cementitious board can further optionally comprise at least one dense layer disposed in contact with the cementitious core.

The cementitious core can comprise any material, substance, or composition containing or derived from hydraulic cement, along with any suitable additives. In some embodiments, the unique combination of a polyvinyl acetate type polymer, monobasic phosphate, and optionally boric acid, are included in the cementitious core in accordance with an aspect of the present invention.

Non-limiting examples of cementitious materials include Portland cement, sorrel cement, slag cement, fly ash cement, calcium alumina cement, water-soluble calcium sulfate anhydrite, calcium sulfate a-hemihydrate, calcium sulfate β-hemihydrate, natural, synthetic or chemically modified calcium sulfate hemihydrate, calcium sulfate dihydrate ("gypsum," "set gypsum," or "hydrated gypsum"), and mixtures thereof. In one aspect, the cementitious material desirably comprises calcined gypsum, such as in the form of calcium sulfate alpha hemihydrate, calcium sulfate beta hemihydrate, and/or calcium sulfate anhydrite. The calcined gypsum can be fibrous in some embodiments and nonfibrous in others. The calcined gypsum can include at least about 50% beta calcium sulfate hemihydrate. In other embodiments, the calcined gypsum can include at least about 86% beta calcium sulfate hemihydrate. The weight ratio of water to calcined gypsum can be any suitable ratio, although, as one of ordinary skill in the art will appreciate, lower ratios are more efficient so that less excess water must be driven off during manufacture, thereby conserving energy. In some embodiments, the cementitious slurry is usually prepared by combining water and calcined gypsum in about a 1:6 ratio by weight respectively to about 1:1 ratio, such as about 2:3 as is typical in board production depending on products. Alternatively, the range can be from about 1:6 to about 1:1 ratio by weight respectively, or even about a 2:3 ratio respectively.

It has been discovered that the addition of a polyvinyl acetate polymer, a monobasic phosphate, and optionally boric acid, to a cementitious slurry imparts enhanced strength (e.g., compressive strength) to the cementitious article particularly in the cementitious core.

Any suitable polyvinyl acetate type polymer can be used in accordance with the present invention. In particular, the polyvinyl acetate type polymer can be any such polymer that crosslinks, for example, in the presence of a monobasic phosphate or boric acid. In such embodiments, the polyvinyl acetate type polymer can be, for example, polyvinyl acetate, polyvinyl alcohol, polyvinyl acetate copolymer, or a polyvinyl alcohol copolymer because of this cross-linking capability with the other inventive additives. Thus, as defined herein, "polyvinyl acetate type polymer" encompasses, without limitation, polyvinyl alcohols. In this respect, the polymerization of polyvinyl acetate and the subsequent hydrolysis to replace some or all of the acetate substituents on the polymer chain with hydroxyl groups forms polyvinyl alcohol. In some embodiments, mixtures of more than one polyvinyl acetate type polymer can be used.

It has been found that commercially available polyvinyl alcohol materials perform satisfactorily in the present invention, and that different grades of polyvinyl alcohol are suitable materials for this invention. The different grades of polyvinyl alcohol products are formed by hydrolyzing polyvinyl acetate to various degrees of hydrolysis. The polyvinyl alcohol used in some embodiments of the present invention preferably is at least about 85% hydrolyzed. If a greater degree of hydrolysis is desired, the polyvinyl alcohol can be at least about 87% or at least about 90% hydrolyzed. In some embodiments, the degree of hydrolysis of the polyvinyl alcohol can be at about 87% to about 90%. By way of example and not any limitation, a particularly suitable material is the polyvinyl alcohol manufactured by Celanese Corporation and marketed under the trademark CELVOL®, e.g., CELVOL® 523S Polyvinyl Alcohol (Celanese Corporation, Dallas, Tex.).

In some embodiments, the polyvinyl acetate type polymer is present in an amount of from about 0.1% to about 2% by weight of the mixture of the cementitious slurry. If desired, the polyvinyl acetate type polymer can be present in an amount of about 0.15% to about 1.5% by weight of the mixture of the cementitious slurry. In other embodiments, the polyvinyl acetate type polymer can be present in an amount of about 0.2% to about 1.0%, about 0.3% to about 0.9%, about 0.4% to about 0.7% or about 0.5% to about 0.6%.

The addition of boric acid to the cementitious slurry imparts further advantages such as enhancing the strength, water resistance, fire retardancy, and adhesion of the facer material to the board, as well as reducing the setting time. In some embodiments, the boric acid is present in an amount of from about 0.1% to about 1.0% by weight of the cementitious slurry. However, if desired, the boric acid can be present in an amount of about 0.1% to about 0.5%, or even about 0.1% to about 0.3 %, by weight of the cementitious slurry. Boric acid, when present, interacts synergistically with the polyvinyl acetate type polymer and monobasic phosphate by enhancing the cross-linking of the polyvinyl acetate type polymer. Food- or industrial-grade boric acid commonly sold by suppliers such as U.S. Borax Inc. or Sigma-Aldrich Corporation can be used in the invention. By way of example only, without limitation, the boric acid can be ReagentPlus B0252-1KG (Sigma-Aldrich, St. Louis, Mo.).

While not wishing to be bound to any particular theory, it is believed that the monobasic phosphate is a salt that acts to impart desirable characteristics to cementitious articles. It is believed that the monobasic phosphate enhances the dry compressive strength, wet or dry surface hardness, and abrasion resistance. In addition, the monobasic phosphate salt exhibits synergistic effects in combination with the polyvinyl acetate type polymer and optionally boric acid to provide increased compressive strength and interfacial adhesion. In some embodiments, the monobasic phosphate is present in an amount of from about 0.1% to about 1.0% by weight of the cementitious slurry. If desired, the monobasic phosphate can be present in an amount of about 0.2% to about 0.8%, about 0.2% to 0.7%, or even 0.2% to 0.5%, by weight of the cementitious slurry. Any suitable monobasic phosphate can be included, such as, for example, monoammonium phosphate, monopotassium phosphate, monosodium phosphate, monolithium phosphate, and combinations thereof. For example, monoammonium phosphate can be used to synergistically enhance the strength of the cementitious article as described herein. Commercially available, food- or industrial-grade monoammonium phosphate from, e.g., Astaris LLC and Sigma-Aldrich Corporation can be used in this invention. By way of example only, without limitation, the monoammonium phosphate can be ReagentPlus A1645-500G (Sigma-Aldrich, St. Louis, Mo.).

In one aspect, boric acid and the monobasic phosphate are present in combination in an amount of from about 0.2% to about 2% total by weight of the cementitious slurry. In an embodiment of the invention, the boric acid and the monobasic phosphate are present in combination in an amount of about 0.3% to about 1.3% or about 0.4% to about 1.0%, or even about 0.5% to about 0.8%, total by weight of the cementitious slurry.

In another aspect, the cementitious slurry comprises: (a) cementitious material present in an amount of from at least about 50% by weight of the cementitious slurry; (b) a polyvinyl acetate type polymer present in an amount of from about 0.1% to about 2% by weight of the cementitious slurry; (c) boric acid present in an amount of from about 0.1% to about 1% by weight of the cementitious slurry; and (d) a monobasic phosphate present in an amount of from about 0.1% to about 1% by weight of the cementitious slurry. The amount of cementitious material present in the cementitious slurry may vary depending on the amounts of other additives that may be desired. However, in some embodiments of the invention, the amount of cementitious material may be about 50% to about 95%, about 50% to about 90%, or even about 50% to about 86%, by weight of the cementitious slurry. In yet another aspect, the cementitious slurry comprising cementitious material in an amount of at least about 50 % by weight of the cementitious slurry, a polyvinyl acetate type polymer present in an amount of from about 0.1% to about 2% by weight of the cementitious slurry, boric acid present in an amount of from about 0.1% to about 1% by weight of the cementitious slurry, and a monobasic phosphate present in an amount of from about 0.1% to about 1% by weight of the cementitious slurry, is deposited on an advancing sheet of facer material comprising glass fiber, polymer fiber, mineral fiber, organic fiber, or a combination thereof. As described above, the amount of cementitious material in the cementitious slurry may vary depending on the amount of other additives that may be desired.

Other suitable additives included in the cementitious core can be any additives commonly used to produce cementitious board. Such additives include, without limitation, structural additives such as mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, and the like. Examples of the use of some of these and other additives are described, for instance, in U.S. Pat. Nos. 6,342,284; 6,632,550; 6,800, 131; 5,643,510; 5,714,001; and 6,774,146; and U.S. Pat. Appl. Pub. Nos. 2004/0231916 A1; 2002/0045074 A1 and 2005/0019618 A1.

Advantageously, in some embodiments, the cementitious core also comprises a hydrophobic agent, such as a silicone-based material (e.g., a silane, siloxane, or silicone-resin matrix), in a suitable amount to further improve the water resistance of the core material. It is also preferred that the set gypsum core comprise a siloxane catalyst, such as magnesium oxide (e.g., dead burned magnesium oxide), fly ash (e.g., Class C fly ash), or a mixture thereof. The siloxane and siloxane catalyst can be added in any suitable amount, and by any suitable method as described herein with respect the method of preparing a water-resistant set gypsum board of the invention, or as described, for example, in U.S. Pat. Appl. Pub. Nos. 2006/0035112 A1 and 2007/0022913 A1.

The siloxane can be added to the cementitious slurry in an aqueous siloxane dispersion comprising about 4 wt. % to about 8 wt. % siloxane in water. See, e.g., co-pending, commonly assigned U.S. patent application Ser. No. 11/738,316. The siloxane can be a cyclic hydrogen-modified siloxane, or a linear hydrogen-modified siloxane. In an embodiment of the invention, the siloxane is a liquid (e.g., a siloxane oil) that may be put into an aqueous dispersion. The siloxane dispersion can be stabilized, such that the siloxane droplets remain dispersed in the water (i.e., the siloxane phase does not substantially separate from the water phase) for a period of time sufficient to allow the dispersion to be combined with other components of the cementitious core.

Desirably, in some embodiments, the cementitious core also comprises strength-improving additives, such as phosphates (e.g., polyphosphates as described in U.S. Pat. Nos. 6,342,284; 6,632,550; and 6,800,131 and U.S. Pat. Appl. Pub. Nos. 2002/0045074 A1; 2005/0019618 A1, and 2007/ 0022913 A1) and/or blended unstable and stable soaps (e.g., as described in U.S. Pat. Nos. 5,683,635 and 5,643,510). The set gypsum core can further comprise paper or glass fibers. In some embodiments, it may be desired that the core be substantially free of paper and/or glass fibers.

Whereas various additives to cementitious slurries have been discussed above with reference to the cementitious core, some or all of the same additives may also be found in one or more dense layers in the board. For example, if the dense layer cementitious slurry or slurries and the core cementitious slurry is formed in a single mixer, the slurries will largely have the same additives, with the exception of a foam component, and/or other additives added to the core slurry after it has been extracted from the mixer, or any additives that are added to the dense layer cementitious slurry after it has been extracted from the mixer. Alternatively, the dense layer cementitious slurry may be formed in a different mixer from the core cementitious slurry. If separate mixers are used, the additives present in the core cementitious slurry and the dense layer cementitious slurry may be different or the same, as desired.

Cementitious board in accordance with the present invention can be manufactured according to known board production processes that are well known in the art. For example, U.S. Pat. No. 7,364,676 discloses a process which includes a continuously moving layer of facer material for receiving the continuous deposition of slurry from a mixer, a mixer for preparing cementitious slurry, and a forming station. It has been found that typical manufacturing process of making cementitious board easily accommodates including polyvinyl acetate type polymer, monobasic phosphate, and optionally boric acid, in the cementitious slurry composition, since the inventive additives do not have adverse effects on board making, and are generally water-soluble, water-miscible, or in an aqueous dispersion. Manufacture of mat-faced board is described, for example, in co-pending, commonly assigned U.S. patent application Ser. No. 11/738,316, filed Apr. 20, 2007; Ser. No. 12/176,200, filed Jul. 18, 2008; and 61/109, 886, filed Oct. 30, 2008.

Briefly, the process typically involves discharging a facer material onto a conveyor, or onto a forming table that rests on a conveyer, which is then positioned under the discharge conduit (e.g., a gate-canister-boot arrangement as known in the art, or an arrangement as described in U.S. Pat. Nos.

6,494,609 and 6,874,930) of a mixer. The components of the cementitious slurry are fed to the mixer comprising the discharge conduit, where they are agitated to form the cementitious slurry. Foam can be added in the discharge conduit (e.g., in the gate as described, for example, in U.S. Pat. Nos. 5,683,635 and 6,494,609). The cementitious slurry is discharged onto the facer material. The slurry is spread, as necessary, over the facer material and optionally covered with a second facer material. See, e.g., U.S. Pat. No. 7,364,676. The wet gypsum slurry assembly thereby provided is conveyed to a forming station where the gypsum is sized to a desired thickness, and to one or more knife sections where it is cut to a desired length to provide a cementitious board. The cementitious board is allowed to set (harden), and, optionally, excess water is removed using a drying process (e.g., by air-drying or transporting the cementitious board through a kiln). It will be appreciated by those skilled in the art that several methods of preparing and depositing cementitious slurry are available.

Without limitation to any method of introducing the additives to a cementitious article, the inventive additives may be introduced during manufacture in any suitable manner, in any suitable location, and in any suitable order. For example, one, two, or all three of the types of inventive additives may be pre-mixed, alone or in combination with other types of the inventive additives or other raw ingredients. Alternatively, each type of additive may be introduced individually during manufacture. In preferred embodiments, the additives are added in dry form so as not to add excess water into the system. However, if desired, any combination of the inventive additives may be delivered in a fluid medium, such as an aqueous medium (e.g., solution, dispersion, slurry, etc.) such as in embodiments where the additives are added during or after setting, e.g., by spraying, dipping, spin coating, brushing, or rolling (or combinations thereof).

In accordance with the present invention, the location where the inventive additives are introduced may depend on whether the additives are included in the core and/or in one or both dense layer(s) of the article, and/or in an outer layer of the article. In some embodiments, the inventive additives are introduced into the pin mixer commonly known in the art for mixing cementitious material, water, and possibly other raw materials used in forming the core of the article. Such an arrangement provides the inventive additives in cementitious slurry for forming the core, and is a particularly useful mode of introduction in embodiments without any dense layer, or in embodiments where the inventive additives are included in the core and in dense layer(s). In this respect, in some embodiments, one or more slurries for forming the dense layer(s) are extracted from the same pin mixer for mixing the cementitious slurry for forming the core, such that inclusion of the inventive additives in the pin mixer provides the inventive additives in the core and in the dense layer(s). It is to be noted that the slurry for forming the dense layer includes less foam than what is in the slurry for forming the core, or the foam is "beaten out" such as by way of one or more secondary mixers.

In some embodiments, the inventive additives are introduced into the discharge conduit of the mixer (such as a gate-canister-boot or including volume restrictor and pressure reducer as in U.S. Pat. No. 6,494,609, etc.). Such arrangements are useful where the additives are desired in the core, and there are no dense layers present. This arrangement also has utility in embodiments where one or both dense layers are present but inclusion of the inventive additives is not desired in the dense layers. In this respect, the dense layer(s) will be extracted from the pin mixer before the inventive additives are introduced downstream of the pin mixer in the discharge conduit. It will be appreciated that it is also possible to tailor the distribution of the inventive additives in one or both dense layers by separately introducing the inventive additives into one or both dense layers in this mode of introduction.

In some embodiments, where the inventive additives are not desired in the core, the inventive additives can be introduced into slurry stream(s) for forming the dense layer(s) after they are extracted from the pin mixer for mixing the cementitious slurry for forming the core, such as in conduits conveying dense slurry such as "edge hoses," or in secondary mixer, such as is employed to beat out foam. In one aspect, the inventive additives can be introduced in multiple mixer arrangements known in the art. See, e.g., U.S. Pat. No. 5,714,032 and U.S. Pat. Appl. Pub. No. 2004/0134585 A1.

The dense layer(s) adds some physical properties to the composite board, such as strength, as well as enhancing adherence of the core to the facer material. The equipment and process for forming the dense layer(s) is generally known in the field of drywall manufacture. The cementitious material in the dense layer is more dense relative to the core cementitious slurry. Thus, foam in the cementitious slurry can be mechanically beaten out as with one or more secondary mixers, and/or can be chemically treated with a defoamer, in some embodiments as is known in the art. In other embodiments, the cementitious slurry is separated into a slurry for the dense layer, and core slurry, with foam being inserted into the core slurry, or the slurry for the dense layer is otherwise formed in the absence of foam, e.g., by inserting foam into the core slurry outside the mixer in a discharge conduit or through a multiple mixer arrangement. In some embodiments, some foam is added to the dense layer slurry, albeit less foam than is added to the core slurry, particularly where edges are formed from the dense layer slurry to avoid having edges that are too hard, as is known in the art. See, e.g., U.S. Pat. Nos. 5,198,052; 5,714,032; 5,718,797; 5,879,498, 5,908,521; 6,494,609; 6,747,922; and U.S. Pat. Appl. Pub. No. 2004/0134585 A1. The dense layer can be of any suitable thickness. For example, in some embodiments, the thickness can vary from about $\frac{1}{16}$ inch to about $\frac{1}{8}$ inch. Also, hard edges, as known in the art, are sometimes used in a manner well known to one of ordinary skill in the art.

In some embodiments, the production of cementitious board optionally can include vibration of the cementitious article prior to hardening to facilitate reduction or elimination of voids in the cementitious slurry, if desired. Any suitable vibration technique or device known in the art, such as, for example, variable frequency tables or platform sections can be used. Any suitable vibration technique known in the art can be used. For example, vibration bars, variable frequency tables, and/or platform sections can be used. Vibration optionally may be turned off, if desired, to further facilitate reducing or preventing bleed-through in some embodiments in glass-mat embodiments which may occur in certain situations such as with the use of a glass mat facer material.

The cementitious slurry comprises any of the materials and additives previously described as suitable or preferred with respect to the cementitious core of the cementitious board, along with sufficient water to provide a suitable viscosity. When measured by the slump test, the gypsum slurry will typically produce a patty with a diameter of about 5 inches to about 8 inches (or about 10 cm to about 20 cm), such as about 6 inches to about 7 inches (or about 15 cm to about 18 cm). Procedures for measuring the viscosity of slurry using the slump test are known in the art. Briefly, a 2 inch (or 5 cm) diameter tube is filled with slurry to a height of 4 inches (10 cm). Within 5 seconds from sampling the slurry from the manufacturing line, the slurry is released from the tube onto a flat, level surface and allowed to spread into a patty. When the slurry has stopped spreading, the widest diameter of the slurry patty is measured (in the case of non-circular (e.g., elliptical) slurry patty, the widest diameter of the slurry patty is averaged with the diameter of the slurry patty in the direction perpendicular to the widest diameter).

Those aspects of the method of preparing a faced cementitious board not specifically described herein can be supplied by the techniques known and used in the manufacture of conventional cementitious board.

In addition to faced cementitious board, in another embodiment of the present invention, the inventive additives can be used in unfaced cementitious board. In one embodiment, unfaced cementitious board of the present invention can be prepared in a manner as described above with respect to faced cementitious board, with the exception that a temporary facer material known in the art as release paper is contacted with the cementitious slurry or slurries instead of paper or a mat. Once the cementitious article has at least partially set, the release paper is removed. Alternatively, unfaced cementitious board of the present invention can be also be prepared by molding or casting processes, or by felting processes as known in the art (e.g., as described in U.S. Pat. No. 7,056,582). In one example of a casting process, a cementitious mixture is deposited in a suitable tray or mold. The water is absorbed by one or more of the ingredients of the cementitious mixture or it can be absorbed by the mold. Once a sufficient amount of water is absorbed or evaporated, the cementitious article is removed from the tray or mold and further dried in an oven. In one example of a felting process, the cementitious slurry is transferred to a continuous porous belt having sides to form the thickness of the panel. Excess water is removed by dewatering, drawing water though the porous material by gravity, by suction, or by application of a press to the wet basemat. Panels are then cut and further dried in an oven. Each of the above steps, as well as processes and equipment for performing such steps, are known in the art.

The cementitious slurry in the manufacture of unfaced cementitious board can be a cementitious component comprising a cementitious material, water, polyvinyl acetate type polymer, monobasic phosphate, and optionally boric acid, and any other ingredient that imparts a desired characteristic to the component and/or cementitious board. Alternatively, a cementitious component comprising a cementitious material, water, polyvinyl acetate type polymer, monobasic phosphate, and optionally boric acid, can be applied to an unfaced cementitious board using any known method, such as, without limitation, spraying, dipping, spin coating, brushing, or rolling (or combinations thereof). In another embodiment, the polyvinyl acetate type polymer, monobasic phosphate, and optional boric acid may be applied to the unfaced cementitious board during setting or in a post-set treatment. The application can be to one or more sides of the unfaced cementitious board. One of skill in the art will appreciate that the description of the manufacture and components of the core of a faced board above has substantial application to the manufacture of the cementitious component of an unfaced cementitious board.

While the present invention has been described above as applied to the manufacture of cementitious board, it also may be used in the manufacture of other non-board cementitious articles. Cementitious articles of the present invention include, for example, interior/exterior statuary, plaster, plaster molds for casting, veneer plaster, and gypsum-cellulosic fiber products. These articles can be manufactured according to production processes that are well known in the art. See, e.g., U.S. Pat. No. 6,822,033. Cementitious articles such as interior/exterior statuary are typically prepared from a cementitious slurry. The cementitious slurry can comprise a cementitious material (as described herein), water, inventive additives, and one or more other optional additives that impart differing properties to the cementitious material. The cementitious slurry is then typically cast into a pre-determined shape or onto the surface of a substrate. For example, the article can be in the form of a mold made of plaster or the like used in casting pottery figurines and the like, using pressure casting or slip casting techniques known in the art. In some embodiments, these articles can be made to be hollow, or have an interior core that is of a different material or composition than an outer layer of the article.

Thus, the cementitious article can have a cementitious component that comprises a cementitious material, water, a polyvinyl acetate type polymer, a monobasic phosphate, and optionally boric acid. The article, when made entirely of a cementitious material, may consist of the cementitious component. Alternatively, if the articles comprise a core of a different material, the outer layer may comprise the cementitious component. In some embodiments, the core may comprise the cementitious component, with an outer layer of the same or a different material.

It is not necessary that the cementitious slurry from which the article is cast contain the polyvinyl acetate type polymer, the monobasic phosphate, and optionally boric acid. For example, the polyvinyl acetate type polymer, the monobasic phosphate, and optionally boric acid may be applied to one or more surfaces of the article by, without limitation, spraying, dipping, spin coating, brushing, or rolling (or combinations thereof) while it sets or in a post-set treatment. In yet another embodiment, the polyvinyl acetate type polymer, the monobasic phosphate, and optionally boric acid may be first applied to the surfaces of the mold or substrate that comes into contact with the cementitious slurry.

The following examples further illustrate the present invention, but should not be construed as in any way limiting its scope.

EXAMPLE 1

Cementitious Articles According to the Present Invention

The following examples 1A and 1B illustrate the preparation of an exemplary glass fiber mat-faced cementitious article, and an exemplary paper faced cementitious article, with an exemplary cementitious core sandwiched between two dense layers in accordance with the invention. Both the cementitious core and the dense layers contain the inventive additives.

EXAMPLE 1A

Glass Fiber Mat-Faced Cementitious Article

A cementitious slurry is prepared in a mixer using the formulation provided in Table 1, having a water-stucco ratio of 75.20%. It is well known in the art that the term "lbs./MSF" means pounds per 1000 square feet of the cementitious article.

TABLE 1

SECUROCK®-Exemplary Formulation

| Component | Average |
|---|---|
| Stucco | 2212 lbs./MSF (10838.8 g/m$^2$) |
| Gauging water | 765 lbs./MSF (3748.5 g/m2) |
| Foam water | 228 lbs/MSF (1117.2 g/m$^2$) |
| Foam air | 19.1 cfm |
| Foaming Agent | 0.17 lbs./MSF (0.833 g/m$^2$) |
| Accelerator | 5.50 lbs./MSF (26.95 g/m$^2$) |
| Dispersant | 10.00 lbs./MSF (49 g/m$^2$) |
| Retarder | 0.13 lbs./MSF (0.637 g/m$^2$) |
| Total water | 1662 lbs./MSF (8143.8 g/m$^2$) |
| Sodium trimetaphosphate (11% solids in water solution) | 6.20 lbs./MSF (30.38 g/m$^2$) |
| Siloxane | 8.01 lbs./MSF (39.249 g/m$^2$) |
| Fly ash | 11.00 lbs./MSF (53.9 g/m$^2$) |
| Biocide | 1.00 lbs./MSF (4.9 g/m$^2$) |
| Starch 1 | 0.00 lbs./MSF (0 g/m$^2$) |
| Starch 2 | 0.00 lbs./MSF (0 g/m$^2$) |
| Glass fiber | 0.00 lbs./MSF (0 g/m$^2$) |
| Polyvinyl Alcohol | 20 lbs./MSF (98 g/m$^2$) |
| Monoammonium Phosphate | 15 lbs./MSF (73.5 g/m$^2$) |
| Boric acid | 10 lbs./MSF (49 g/m$^2$) |

The mixer discharges cementitious slurry for both the dense layers and the core layer. Cementitious slurry for the core layer includes the same components as the dense layer, as well as a foaming agent so that the core layer is less dense than the dense layer. In this example, the foam component is incorporated into the slurry stream outside of the mixer. Before it is incorporated in the slurry stream, the foam component is generated separately using conventional foam generation equipment, including high shear mixing of air and soap solution.

Both sides (face and back) of the cementitious article comprise a fibrous glass mat. The face and back fibrous mats are made of the same material. The fibrous glass mat is non-woven and comprises a 28 wt. % melamine formaldehyde/acrylic binder. The fibrous glass mat is passed through a tensioned alignment system. The face mat is also creased along its side edges to facilitate the proper formation of the ⅝ inch desired thickness and edge profile. The creases are also positioned such that the finished product will have a width of 48 inches. The face fibrous glass mat is positioned on a moving conveyor for deposition of the cementitious slurry onto the mat.

A first portion of the unfoamed, relatively dense cementitious slurry is extracted from the mixer. This first portion of dense cementitious slurry is deposited onto the face mat. A slurry spreader (in this example, a roller) is used to spread the dense layer slurry over the facer material to a thickness of about 1/16 inch, thereby forming a dense layer across the width of the face of the board.

A second portion of slurry for forming the less dense core layer is also extracted from the same mixer. The second portion of slurry is combined with the foam component outside of the mixer in a discharge apparatus thereof. The resulting less-dense cementitious core slurry is also deposited onto the fibrous glass mat, to which the dense layer was applied.

To complete a glass mat envelope filled with cementitious slurry, a back mat is applied over the face mat, on which the cementitious slurry comprising the foam component has been applied. The back glass mat is made of the same material as the face mat. A dense layer optionally can be applied to the back fibrous glass mat as described above relative to the face mat, if desired.

As the face mat with the deposited cementitious slurry approaches the forming plate, the creased edges of the face mat are folded around the deposited cementitious slurries to form the edges of the glass mat envelope. The back mat with a dense layer is placed in contact with the edges of the face mat. A glue line is used to bond the face glass mat to the back glass mat at the point where the mats contact. Slurry does not contact the face and back mats where the mats contact.

The completed glass mat envelope, filled with the cementitious slurries, exits the forming plate and is transferred to a conveyer belt. The conveyor has a means for keeping the edges in proper configuration and position until the slurry hydrates (sets) and the board is self supporting. Once the slurry sets, the glass mat envelope comprising set cementitious slurry is cut into panels slightly longer than the desired length of the finished product (e.g., 8 feet, 9 feet, 10 feet, 12 feet, or other desired length) with a board knife. The panels are inverted such that the back mat comes into contact with the moving conveyor, and the face mat is no longer in contact with the conveyor. To remove excess water, the panels are dried in a kiln. Once dried, the panels are finished into a final product by trimming the panels to their final lengths, and packaging the finished product.

The resulting product is a glass mat-faced cementitious product with improved compressive strength and interfacial binding strength, such as that sold by USG Corporation under the trademark SECUROCK®.

EXAMPLE 1B

Paper-Faced Cementitious Article

The following example illustrates the preparation of an exemplary paper faced cementitious article with an exemplary cementitious core sandwiched between two dense layers in accordance with the invention. Both the cementitious core and the dense layers contain the inventive additives.

A cementitious slurry is prepared in accordance with the formulation provided in Table 2, having a water-stucco ratio of 85.20%.

TABLE 2

MOLD TOUGH®-Exemplary Formulation

| Component | Average |
|---|---|
| Stucco | 1869 lbs./MSF (9158.1 g/m$^2$) |
| Gauging water | 773 lbs./MSF (3787.7 g/m2) |
| Foam water | 129 lbs/MSF (632.1 g/m$^2$) |
| Foam air | 16.3 cfm |
| Foaming Agent | 0.14 lbs./MSF (0.686 g/m$^2$) |
| Accelerator | 5.52 lbs./MSF (27.048 g/m$^2$) |
| Dispersant | 10.00 lbs./MSF (49 g/m$^2$) |
| Retarder | 0.20 lbs./MSF (0.98 g/m$^2$) |
| Total water | 1591 lbs./MSF (7795.9 g/m$^2$) |
| Sodium trimetaphosphate (11% solids in water solution) | 6.20 lbs./MSF (30.38 g/m$^2$) |
| Siloxane | 13.00 lbs./MSF (63.7 g/m$^2$) |
| Flyash | 11.00 lbs./MSF (53.9 g/m$^2$) |
| Biocide | 3.35 lbs./MSF (16.415 g/m$^2$) |
| Starch 1 | 3.00 lbs./MSF (14.7 g/m$^2$) |
| Starch 2 | 4.00 lbs./MSF (19.6 g/m$^2$) |
| Glass fiber | 7.5 lbs./MSF (36.75 g/m$^2$) |
| Polyvinyl Alcohol | 20 lbs./MSF (98 g/m$^2$) |
| Monoammonium Phosphate | 15 lbs./MSF (73.5 g/m$^2$) |
| Boric acid | 10 lbs./MSF (49 g/m$^2$) |

The paper faced cementitious article with two different types of paper facer material on either side is prepared according to the method described in Example 1A. The paper-faced cementitious product is made to a thickness of ⅝ inch as was the product of Example 1A.

The resulting product is a paper faced cementitious product, with improved compressive strength, such as that sold by USG Corporation under the trademark MOLD TOUGH®.

EXAMPLE 2

Laboratory Cube Compressive Strength

This example illustrates the enhanced strength of cementitious cubes that contain the inventive additives. Samples of the gypsum-containing products were prepared in accordance with the invention and compared, in regard to strength, with samples prepared without the inventive additives. The test procedure employed was in accordance with ASTM C472-99, which is one way of measuring the strength of cementitious cubes. This procedure has been selected to illustrate the enhancement of the strength of cementitious cubes made according to the invention. However, any test known in the art can be used to determine the relative strength of the cementitious cubes.

Samples were prepared according to the formulations set forth in Table 3. Formulas 1 and 4 do not contain the inventive additives (Control Samples). The polyvinyl alcohol used in this example (and following examples) was Celvol 523S (Celanese Corporation, Dallas, Tex.). Boric acid powder was obtained from Sigma-Aldrich Corporation with the designation ReagentPlus B0252-1KG. Monoammonium phosphate powder was obtained from Sigma-Aldrich Corporation with the designation A1645-500G. The calcium sulfate hemihydrate (stucco) was provided by USG's Southard, Oklahoma facility. The accelerator of this example is finely ground gypsum. In this example, the finely ground gypsum is protected by sugar so as to be heat-stabilized as is well within the skill of the ordinary artisan. The amount of accelerator, 4 g, in each of the controls was selected to allow for a proper hydration rate of the stucco in the slurry, that are comparable to the hydration rates that are common in the manufacture of fiber mat-faced or paper-faced cementitious products, as described in Example 1. The addition of inventive additives requires 6 g of accelerator to maintain a consistent hydration rate as that of a cementitious core without the inventive additives.

The slurries of each formula were made by combining and mixing together all of the ingredients. Slurries of each formula were cast into cubes (2 inches per side). After the calcium sulfate hemihydrate set to form gypsum, the cubes were removed from the molds and dried in an oven at 116° F. for at least 24 hours, or until they reached a constant weight. The cubes were cooled down to room temperature prior to testing.

Compressive strength for each cube was measured according to the procedures set forth in ASTM C472-99, on a SATEC 120 HVL testing machine. Results are as shown in Table 4.

TABLE 3

Cube Formulation for Compressive Strength Testing

| Ingredients | Formula 1 | Formula 2 | Formula 3 | Formula 4 | Formula 5 | Formula 6 |
|---|---|---|---|---|---|---|
| Stucco | 1000 g | 1000 g | 1000 g | 1000 g | 1000 g | 1000 g |
| Accelerator | 4 g | 6 g | 6 g | 4 g | 6 g | 6 g |
| Dispersant | 2 ml | 2 ml | 2 ml | 2 ml | 2 ml | 2 ml |
| Water | 1100 ml | 1100 ml | 1100 ml | 1100 ml | 1100 ml | 1100 ml |
| Flyash | 0 | 0 | 0 | 6 | 6 | 6 |
| Siloxane | 20 ml | 20 ml | 20 ml | 20 ml | 20 ml | 20 ml |
| Polyvinyl Alcohol | 0 g | 5 g | 5 g | 0 g | 5 g | 5 g |
| Monoammonium Phosphate | 0 g | 2.5 g | 2.5 g | 0 g | 2.5 g | 2.5 g |
| Boric Acid | 0 g | 0 g | 2.5 g | 0 g | 0 g | 2.5 g |

TABLE 4

Compressive Strength

| Formula | Compressive Strength (PSI) |
|---|---|
| Formula 1 | 912.47 |
| Formula 2 | 1061.58 |
| Formula 3 | 1066.75 |
| Formula 4 | 947.81 |
| Formula 5 | 958.22 |
| Formula 6 | 1015.81 |

The results in Table 4 show that the addition of inventive additives into the cementitious slurry increases the compressive strength of the cementitious article.

EXAMPLE 3

Compressive Strength

This example further illustrates the enhanced strength of cementitious cubes that contain the inventive additives. Samples of the gypsum-containing products were prepared in accordance with the invention and compared, in regard to strength, with samples prepared without the inventive additives. No siloxane or fly ash was present in the sample cubes for this experiment. The test procedure employed was in accordance with ASTM C472-99, and as described above in Example 2.

Formulations for the sample cubes are shown in Table 5, and compressive strength test results are shown in Table 6.

TABLE 5

Cube Formulation for Compressive Strength Testing

| Ingredients | Formula 1 | Formula 2 | Formula 3 |
|---|---|---|---|
| Stucco | 1000 g | 1000 g | 1000 g |
| Accelerator | 4 g | 4 g | 4 g |
| Dispersant | 2 ml | 2 ml | 2 ml |
| Water | 1100 ml | 1100 ml | 1100 ml |
| Polyvinyl Alcohol | 0 g | 5 g | 5 g |
| Monoammonium Phosphate | 0 g | 2.5 g | 2.5 g |
| Boric Acid | 0 g | 0 g | 2.5 g |

TABLE 6

Compressive Strength

| Formula | Compressive Strength (PSI) |
|---|---|
| Formula 1 | 1208.39 |
| Formula 2 | 1276.50 |
| Formula 3 | 1275.04 |

The results in Table 6 show that the addition of inventive additives into the cementitious slurry increases the compressive strength of the cementitious article.

EXAMPLE 4

Adhesive Strength

This example illustrates the enhanced interfacial bonding strength ("adhesive strength") between the cementitious core and a glass fiber mat facer material as a result of adding polyvinyl alcohol and monoammonium phosphate into the cementitious slurry. Samples of the glass fiber mat faced gypsum boards were prepared in accordance with the invention and compared, in regard to interfacial adhesion strength between the cementitious core and the glass fiber mat facer material (manufactured at USG's Empire, Nevada facility), with samples prepared without the inventive additives. The method by which glass fiber mat faced gypsum board can be prepared was previously described in Example 1A and, generally, above in the specification.

Adhesion tests according to TAPPI Test Method T-541 were conducted. While TAPPI Test Method T-541 provides one method for measuring the adhesive strength of a material to a cementitious core, any method known in the art can be used to measure the adhesive strength of the inventive cementitious material.

To conduct TAPPI Test Method T-541, glass mat faced samples were prepared according to the formulations in Table 5. Formula 2 and Formula 3 have varying amounts of polyvinyl alcohol and monoammonium phosphate.

TABLE 7

Formulation for Gypsum Board With Glass-Mat Facer Material

| Ingredients | Formula 1 | Formula 2 | Formula 3 |
|---|---|---|---|
| Stucco | 3000 g | 3000 g | 3000 g |
| Accelerator | 8.0 g | 8.0 g | 8.0 g |
| Dispersant | 5 g | 5 g | 5 g |
| Water | 3300 ml | 3300 ml | 3300 ml |
| Deformer Nalco 60096 | 0.5 g | 0.5 g | 0.5 g |
| Polyvinyl Alcohol | 0 | 15 g | 30 g |
| Monoammonium Phosphate | 0 | 15 g | 30 g |

The samples were dried at 350° F. for 20 minutes then transferred to a 110° F. oven for 24 hours, after which samples (3 inches×6 inches) were cut for testing using a z-direction tensile-compression tester. A 1 inch×1 inch square cut was made onto the surface of the cementitious article such that the mat was scored. The 1 inch×1 inch area of the mat was then subjected to tests for interfacial bonding strength.

According to TAPPI Test Method T-541, after a two hour fresh water soak, samples were removed and allowed to dry. Adhesion test results averaged from three samples for each formulation are presented in Table 6.

TABLE 8

Adhesive Strength

| Formulation | Average Strength Required to Remove Facer (lb) |
|---|---|
| Formula 1 | 0.823 |
| Formula 2 | 11.572 |
| Formula 3 | 20.227 |

These results show that the addition of inventive additives polyvinyl alcohol and monoammonium phosphate into the cementitious slurry increases interfacial binding strength between the cementitious core and the facer material after a two hour soak in water.

EXAMPLE 5

Adhesive Strength

This example illustrates the enhanced interfacial bonding strength between the cementitious core and a glass-mat facer material as a result of adding polyvinyl alcohol, monoammonium phosphate, and boric acid into the cementitious slurry. Samples were tested for interfacial bonding strength according to TAPPI Test Method T-541 as noted above in Example 4. Glass mat faced (manufactured at USG's Empire, Nevada facility) samples were prepared according to the formulations in Table 7.

TABLE 9

Formulation for Gypsum Board With Glass-Mat Facer Material

| Ingredients | Formula 1 | Formula 2 | Formula 3 |
|---|---|---|---|
| Stucco | 1000 g | 1000 g | 1000 g |
| Accelerator | 4.0 g | 4.0 g | 4.0 g |
| Dispersant | 2 ml | 2 ml | 2 ml |
| Water | 1100 ml | 1100 ml | 1100 ml |
| Polyvinyl Alcohol | 0 | 5 g | 5 g |
| Monoammonium Phosphate | 0 | 2.5 g | 2.5 g |
| Boric Acid | 0 | 0 | 2.5 g |

The samples were cut into 2 inch×2 inch sizes appropriate for testing using a z-direction tensile-compression tester as described in Example 4, above. Results are shown in Table 8.

TABLE 10

Adhesive Strength

| Formulation | Average Strength Required to Remove Facer (lb) |
|---|---|
| Formula 1 | 2.82 |
| Formula 2 | 8.41 |
| Formula 3 | 9.06 |

These results show that the addition of polyvinyl alcohol and monoammonium phosphate enhances the interfacial bonding strength between a cementitious core and a facer material. The addition of boric acid further enhances the interfacial bonding strength of the cementitious article.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. For example, it will be understood that "a polyvinyl acetate type polymer" or "a monobasic phosphate" could include more than one of each of these ingredients. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing a cementitious article comprising:
   (a) preparing a cementitious slurry, wherein the cementitious slurry comprises:
      (i) cementitious material present in an amount of at least about 50% by weight of the cementitious slurry;
      (ii) polyvinyl acetate or polyvinyl alcohol polymer or copolymer present in an amount of from about 0.1% to about 2% by weight of the cementitious slurry;
      (iii) boric acid present in an amount of from about 0.1% to about 1% by weight of the cementitious slurry; and
      (iv) monobasic phosphate present in an amount of from about 0.1% to about 1% by weight of the cementitious slurry;
   (b) depositing the cementitious slurry onto an advancing sheet of facer material; and
   (c) allowing the slurry to set.

2. The method of claim 1, wherein the facer material comprises glass fiber, polymer fiber, mineral fiber, organic fiber, or a combination thereof.

3. A cementitious article comprising:
   (a) a cementitious component that (i) comprises a cementitious material, a polyvinyl acetate or polyvinyl alcohol polymer or copolymer, a monobasic phosphate, and optionally boric acid; (ii) is formed from a slurry that comprises a cementitious material, a polyvinyl acetate or polyvinyl alcohol polymer or copolymer, a monobasic phosphate, and optionally boric acid; or both (i) and (ii); and
   (b) a first surface of the component, a second surface of the component, and a central region of the component, overlapping a central axis, halfway between the first surface and the second surface; wherein the total concentration of the polyvinyl acetate or polyvinyl alcohol polymer or copolymer, monobasic phosphate, and optionally boric acid, in one or both regions in the component adjacent the first and second surfaces, respectively, is greater than the total concentration of the polyvinyl acetate or polyvinyl alcohol polymer or copolymer, monobasic phosphate, and boric acid in the central region of the component; and
   (c) at least one facer layer for supporting the component.

4. The cementitious article of claim 3, the facer layer comprising glass fiber, polymer fiber, mineral fiber, organic fiber, or a combination thereof.

5. The cementitious article of claim 4, further comprising at least one dense layer optionally comprising a polyvinyl acetate or polyvinyl alcohol polymer or copolymer, a monobasic phosphate, and optionally boric acid, wherein the dense layer is disposed between the component and the at least one facer layer.

6. A method of preparing a cementitious article comprising:
   (a) preparing a cementitious slurry, the cementitious slurry comprising cementitious material, a polyvinyl acetate or polyvinyl alcohol polymer or copolymer, a monobasic phosphate, about 0.1-0.5 wt. % boric acid, and water; and
   (b) allowing the slurry to set.

7. The method of claim 6, further comprising depositing the cementitious slurry on a facer layer for supporting the component, the facer layer comprising glass fiber, polymer fiber, mineral fiber, organic fiber, or a combination thereof.

8. A cementitious article comprising a cementitious component, wherein the cementitous component (i) comprises a cementitious material, a polyvinyl acetate or polyvinyl alcohol polymer or copolymer, a monobasic phosphate, and about 0.1-0.5 wt. % boric acid; (ii) is formed from a slurry that comprises a cementitious material, a polyvinyl acetate or polyvinyl alcohol polymer or copolymer, about 0.1-1 wt. % of a monobasic phosphate, and about 0.1-0.5 wt. % boric acid; or both (i) and (ii).

* * * * *